(12) United States Patent
Kuroda

(10) Patent No.: US 7,978,420 B2
(45) Date of Patent: Jul. 12, 2011

(54) ZOOM LENS AND IMAGING APPARATUS

(75) Inventor: Daisuke Kuroda, Kanagawa (JP)

(73) Assignee: Sony Corporation (JP)

( * ) Notice: Subject to any disclaimer, the term of this patent is extended or adjusted under 35 U.S.C. 154(b) by 56 days.

(21) Appl. No.: 12/590,621

(22) Filed: Nov. 10, 2009

(65) Prior Publication Data

US 2010/0149657 A1 Jun. 17, 2010

(30) Foreign Application Priority Data

Dec. 12, 2008 (JP) .............................. P2008-316781

(51) Int. Cl.
*G02B 15/14* (2006.01)
*H04N 5/262* (2006.01)

(52) U.S. Cl. ...................... 359/682; 359/680; 348/240.3

(58) Field of Classification Search ................ 348/240.3; 359/680, 682, 689
See application file for complete search history.

(56) References Cited

U.S. PATENT DOCUMENTS

| | | | |
|---|---|---|---|
| 7,446,956 B2 | 11/2008 | Shimada | |
| 2009/0009884 A1* | 1/2009 | Ohtake et al. | 359/689 |
| 2009/0303611 A1* | 12/2009 | Fujisaki et al. | 359/689 |

FOREIGN PATENT DOCUMENTS

| | | |
|---|---|---|
| JP | 2004-061675 A | 2/2004 |
| JP | 2007-212636 A | 8/2007 |
| JP | 2007-333799 A | 12/2007 |
| JP | 2008151832 A | 7/2008 |
| JP | 2008170577 A | 7/2008 |
| JP | 2008203449 A | 9/2008 |
| JP | 2008257179 A | 10/2008 |

OTHER PUBLICATIONS

JPO Office Action for JP2008-316781(Translated) dated Sep. 9, 2010.*
JPO Office Action for JP2008-316781(Translated) dated Dec. 2, 2010.*
JPO Office Action for JP2008-316781(Translated) dated Feb. 10, 2011.*

* cited by examiner

*Primary Examiner* — David N Spector
(74) *Attorney, Agent, or Firm* — Lerner, David, Littenberg, Krumholz & Mentlik, LLP

(57) ABSTRACT

A zoom lens includes: first, second and third lens groups having negative refracting power, positive refracting power and positive refracting power, respectively, disposed in the order from an object side. During zooming from a wide angle end to a telephoto end, the first lens group is moved and the second lens group is moved together with a stop toward the object such that an air space between the first and second lens groups decreases and an air space between the second and third lens groups increases. The second lens group includes positive and negative lenses aspherically shaped on at least a side thereof facing the object and having a convex or concave surface facing the object, the negative lens being positioned on the image side of the positive lens. The zoom lens is configured to satisfy the following Conditional Expressions (1) and (2)

$$0.7 < R2f/R2r < 2.0 \quad (1)$$

$$1.0 < |Sga/Sgs| < 1.5 \quad (2).$$

10 Claims, 22 Drawing Sheets

FIG.1
— CENTRAL LIGHT FLUX
---- PERIPHERAL LIGHT FLUX
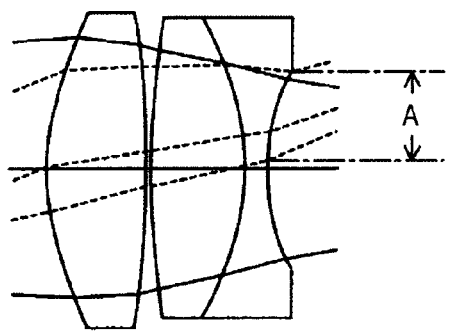
WIDE ANGLE END
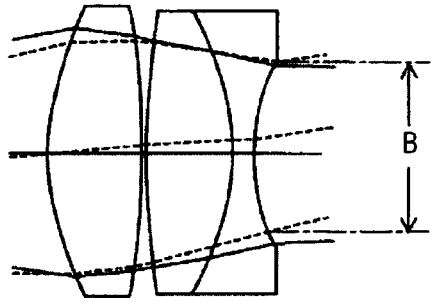
TELEPHOTO END

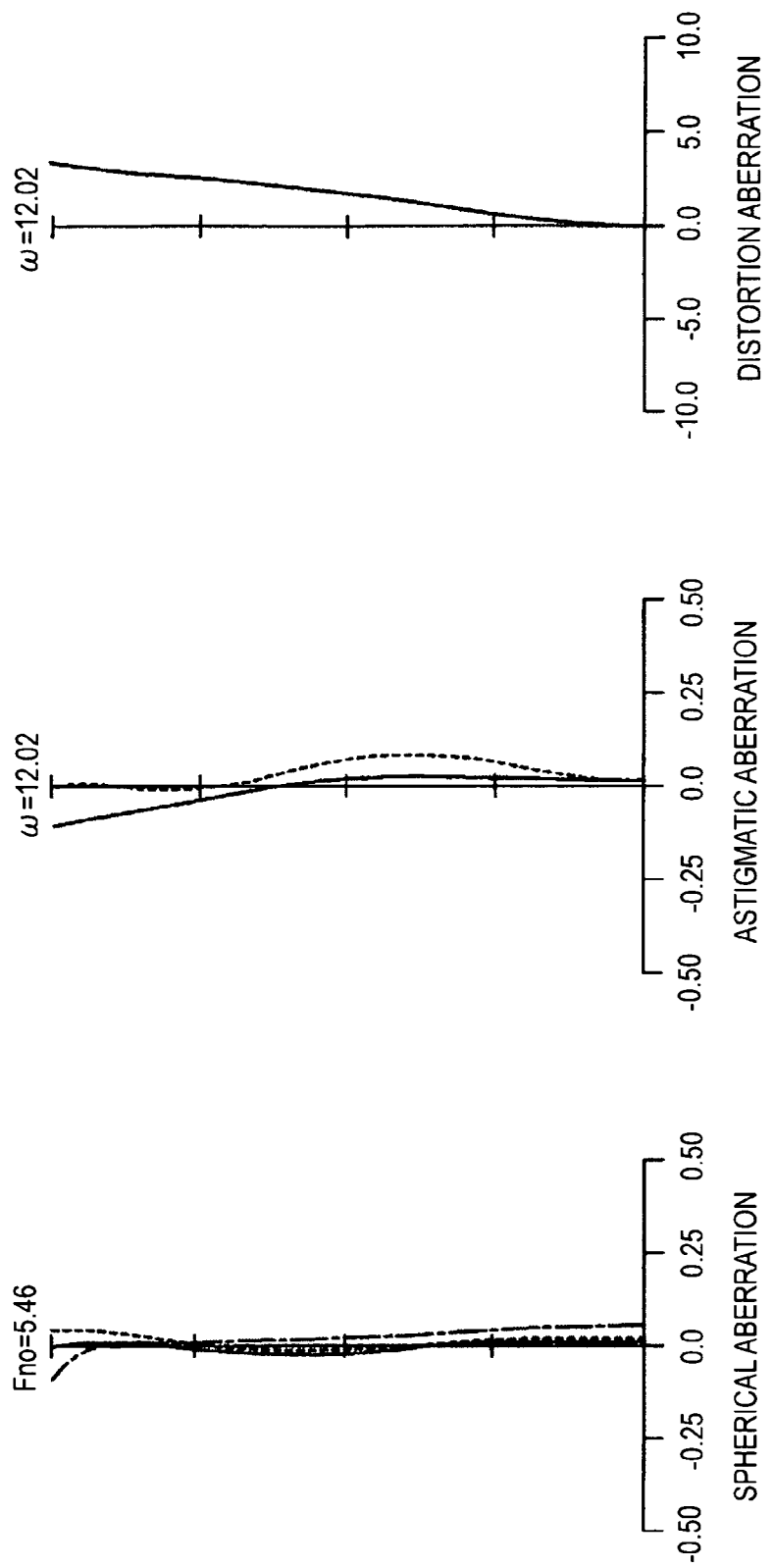

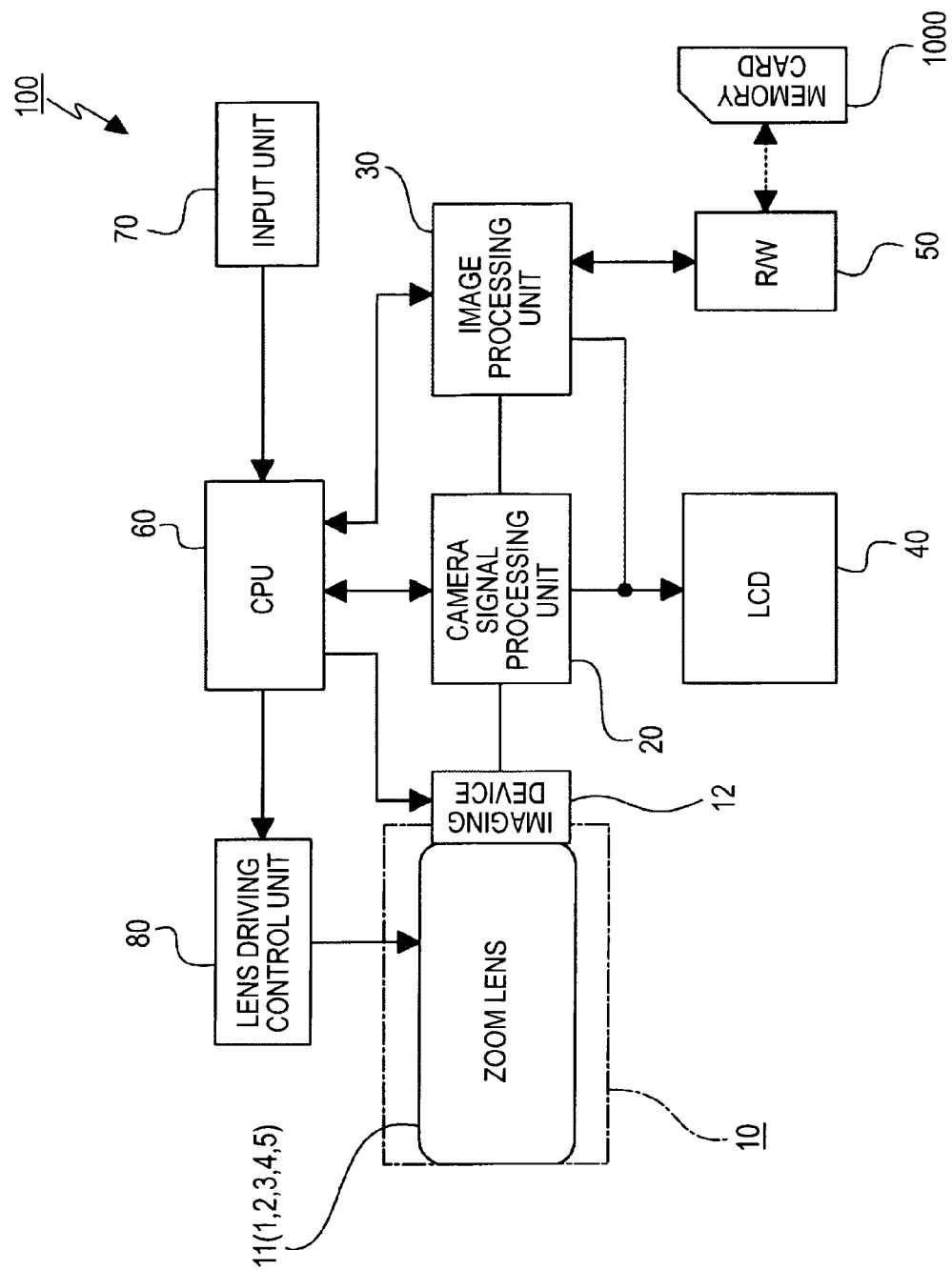

ZOOM LENS AND IMAGING APPARATUS

CROSS-REFERENCE TO RELATED APPLICATION

The present application claims priority from Japanese Patent Application No. JP 2008-316781 filed in the Japanese Patent Office on Dec. 12, 2008, the entire content of which is incorporated herein by reference.

BACKGROUND OF THE INVENTION

1. Field of the Invention

The present invention relates to a zoom lens and an imaging apparatus. More specifically, the invention relates to the technical field of compact and high performance zoom lenses which can be advantageously used in imaging optical systems of digital input/output apparatus such as digital still cameras and digital video cameras and the technical field of imaging apparatus utilizing such zoom lenses.

2. Description of the Related Art

Recently, imaging apparatus such as digital still cameras using a solid-state imaging device has become popular. It is desirable to provide an imaging apparatus having further higher image quality as the apparatus such as digital still cameras are becoming popular. Particularly in the digital still cameras and so on, it is desirable to provide an imaging lens, especially a zoom lens, which has excellent focusing performance responding to a solid-state imaging device having a large number of pixels.

In addition to demand for higher image quality, demand for greater angles of view is becoming strong, and it is desirable to provide a compact zoom lens having a great zoom ratio, for example, 4× or more, and having a great angle of view, for example, exceeding 38 deg in terms of half-angle of view.

There are various types of zoom lenses to be used in digital still cameras, and as the lens types which can be provided with a small size and a great angle of view, three-group zoom lenses formed by a first lens group having negative refracting power, a second lens group having positive refracting power, and a third lens group having positive refracting power, which are disposed in the order from an object side to an image side are known (for example, see JP-A-2004-61675 (Patent Document 1, JP-A-2007-212636 (Patent Document 2) and JP-A-2007-333799 (Patent Document 3).

Referring to Patent Document 1, a second lens group includes two positive lenses and one negative lens to thereby realize a high-performance and compact zoom lens having a zoom ratio of approximately 3×.

Referring to Patent Document 2, a second lens group includes four lenses of a first cemented lens formed by bonding a positive lens and a negative lens, and a second cemented lens formed by bonding a negative lens and a positive lens to thereby realize a high-performance zoom lens having a great angle of view in which a zoom ratio is approximately 3.4×.

Referring to Patent Document 3, a second lens group includes four lenses of a positive lens, a cemented lens formed by bonding a positive lens and a negative lens, and a positive lens to thereby realize a high-performance zoom lens having a great angle of view in which a zoom ratio is approximately 3.4×.

SUMMARY OF THE INVENTION

In the zoom lens disclosed in Patent Document 1, the second lens group is formed by three lenses to achieve compactness, however, a half-angle of view is 32 deg or less and a zoom ratio is lower than 3.3×, and it is therefore incorrect to say that the zoom lens sufficiently satisfies the recent demands for greater angles of view as well as greater zoom ratios.

The zoom lenses disclosed in Patent Document 2 and Patent Document 3 have half-angles view of 32 deg to 38 deg and zoom ratios of 3.0× to 3.5× by forming the second lens group by four lenses to thereby achieve a great angle of view and a great zoom ratio.

However, it is incorrect to say that the zoom lenses having the half-angles view of 32 deg to 38 deg and the zoom ratios of 3.0× to 3.5× sufficiently satisfy the recent demands. Since the second lens group is formed by four lenses, the thickness of the second lens group is increased, which hinders reduction of the entire optical length. Particularly, in the case that the zoom lens is applied to a collapsible-barrel type imaging apparatus in which a lens barrel is collapsed and expanded, the zoom lens may hinder the reduction the entire length in the collapsed state.

Thus, it is desirable to provide a zoom lens and an imaging apparatus in which the above-described problems are solved to achieve compactness and high optical performance including a great angle of view and a high zoom ratio.

According to an embodiment of the invention, there is provided a zoom lens including a first lens group having negative refracting power, a second lens group having positive refracting power, and a third lens group having positive refracting power, disposed in the order from an object side to an image side. During zooming from a wide angle end to a telephoto end, the first lens group is moved and the second lens group is moved together with a stop toward the object such that an air space between the first lens group and the second lens group decreases and such that an air space between the second lens group and the third lens group increases. The second lens group includes a positive lens aspherically shaped on at least a side thereof facing the object and having a convex surface facing the object and a negative lens positioned on the image side of the positive lens, aspherically shaped on at least a side thereof facing the image and having a concave surface facing the image. The zoom lens is configured to satisfy the following Conditional Expressions (1) and (2):

$$0.7 < R2f/R2r < 2.0 \tag{1}$$

$$1.0 < |Sga/Sgs| < 1.5 \tag{2}$$

wherein $R2f$ represents a paraxial radius of curvature of the object-facing surface of the positive lens; $R2r$ represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

Thus, the radius of curvature at the center of the lens in the image-facing surface of the negative lens and the approximate radius of curvature at the periphery are changed on a large scale, thereby changing refracting power to the light flux passing through the center and the light flux passing through the periphery.

Preferably, the second lens group of the above-described zoom lens includes the positive lens, a positive lens which has a convex surface facing the object and the negative lens, which are disposed in the order from the object side to the image side.

When the zoom lens is configured as described above, the second lens group can be formed by a smaller number of lenses, which are three.

Preferably, the second lens group of the above-described zoom lens includes the positive lens and a cemented lens formed by bonding a positive lens having a convex surface facing the object and the negative lens, which are disposed in the order from the object side to the image side.

When the second lens group is configured as described above, the second lens group can be formed by a smaller number of lenses, which are three.

Preferably, the first lens group of the above-described zoom lens includes a negative lens aspherically shaped on both sides thereof and having a concave surface facing the image and a positive meniscus lens aspherically shaped on at least a side thereof facing the object and having a convex surface facing the object, which are disposed in the order from the object side to the image side.

When the first lens is configured as the above, correction is satisfactorily performed on distortion aberrations at the wide angle end and spherical aberrations at the telephoto end.

Preferably, the above-described zoom lens is configured to satisfy the following Conditional Expressions (3), (4) and (5):

$$1.5<|f2/fw|<2.5 \quad (3)$$

$$2.0<|f1/fw|<3.2 \quad (4)$$

$$0.5<D2/fw<1.5 \quad (5)$$

wherein f2 represents the focal length of the second lens group; fw represents the focal length of the entire lens system at the state of the wide angle end; f1 represents the focal length of the first lens group; and D2 represents the thickness of the second lens group measured on the optical axis thereof.

When the zoom lens is configured to satisfy Conditional Expressions (3), (4) and (5), aberrations occurring at the first lens group and the second lens group can be suppressed.

Preferably, in the above-described zoom lens, the third lens group is configured by a single lens having a focusing function.

When the third lens group is configured by the single lens having the focusing function, interference between the third lens group and a control system for driving and controlling a shutter unit and an iris unit or an anti-vibration driving system for shifting a lens group can be reduced.

Preferably, the above zoom lens is configured to satisfy the following Conditional Expressions (6), (7) and (8):

$$n11>1.8 \quad (6)$$

$$n12>1.9 \quad (7)$$

$$v12<25 \quad (8)$$

wherein n11 represents the refractive index of the negative lens in the first lens group measured using a d-ray, n12 represents the refractive index of the positive meniscus lens in the first lens group measured using a d-ray; and v12 represents the Abbe number of the positive meniscus lens in the first lens group.

When the zoom lens is configured to satisfy Conditional Expressions (6), (7) and (8), correction is satisfactorily performed on chromatic aberrations of the entire lens system in addition to achievement of compactness in the first lens group.

Preferably, the above zoom lens does not change an aperture diameter of the stop during zooming.

The aperture diameter of the stop is not changed during zooming, thereby cutting or simplifying a driving mechanism for changing the aperture diameter of the stop.

In the above zoom lens, it is preferable to perform alignment between a positive lens of the second lens group positioned on the object side and a cemented lens of the second lens group.

The alignment is performed between the positive lens of the second lens group positioned on the object and the cemented lens, thereby suppressing deterioration of resolution performance caused by component tolerance and manufacturing tolerance.

According to another embodiment of the invention, there is provided an imaging apparatus including a zoom lens and an imaging device converting an optical image formed by the zoom lens into an electrical signal. The zoom lens includes a first lens group having negative refracting power, a second lens group having positive refracting power, and a third lens group having positive refracting power, disposed in the order from an object side to an image side. During zooming from a wide angle end to a telephoto end, the first lens group is moved and the second lens group is moved together with a stop toward the object such that an air space between the first lens group and the second lens group decreases and such that an air space between the second lens group and the third lens group increases. The second lens group includes a positive lens aspherically shaped on at least a side thereof facing the object and having a convex surface facing the object and a negative lens positioned at the image side of the positive lens, aspherically shaped on at least a side thereof facing the image and having a concave surface facing the image. The imaging apparatus is configured to satisfy the following Conditional Expressions (1) and (2):

$$0.7<R2f/R2r<2.0 \quad (1)$$

$$1.0<|Sga/Sgs|<1.5 \quad (2)$$

wherein R2f represents a paraxial radius of curvature of the object-facing surface of the positive lens; R2r represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

Thus, the radius of curvature at the center of the lens in the image-facing surface of the negative lens and the approximate radius of curvature at the periphery are changed on a large scale, thereby changing refracting power to the light flux passing through the center and the light flux passing through the periphery.

The zoom lens according to the embodiment of the invention includes a first lens group having negative refracting power, a second lens group having positive refracting power, and a third lens group having positive refracting power, disposed in the order from an object side to an image side. During zooming from a wide angle end to a telephoto end, the first lens group is moved and the second lens group is moved together with a stop toward the object such that an air space between the first lens group and the second lens group decreases and such that an air space between the second lens group and the third lens group increases. The second lens group includes a positive lens aspherically shaped on at least a side thereof facing the object and having a convex surface facing the object and a negative lens positioned at the image side of the positive lens, aspherically shaped on at least a side thereof facing the image and having a concave surface facing the image. The zoom lens is configured to satisfy the following Conditional Expressions (1) and (2):

$$0.7 < R2f/R2r < 2.0 \quad (1)$$

$$1.0 < |Sga/Sgs| < 1.5 \quad (2)$$

wherein $R2f$ represents a paraxial radius of curvature of the object-facing surface of the positive lens; $R2r$ represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

Thus, the radius of curvature at the center of the lens in the image-facing surface of the negative lens and the approximate radius of curvature at the periphery are changed on a large scale, thereby changing refracting power to the light flux passing through the center and the light flux passing through the periphery. Therefore, distortion aberration at the wide angle end and the spherical aberration at the telephoto end caused by a great angle of view and a great zoom ratio can be efficiently corrected, as a result, the zoom lens can be made small while achieving high optical performance including a great angle of view and a great zoom ratio.

According to one preferred configuration described above, the second lens group is formed by the positive lens, a positive lens which has a convex surface facing the object and the negative lens, which are disposed in the order from the object side to the image side.

Thus, the principal point of the front side in the second lens group can be made close to the object side, which enables reduction of the entire optical length.

According to another preferred configuration described above, the second lens group includes the positive lens and a cemented lens formed by bonding the positive lens having a convex surface facing the object and the negative lens, which are disposed in the order from the object side to the image side.

Thus, the principal point of the front side in the second lens group can be made close to the object side, which enables reduction of the entire optical length. In addition, the lenses of in the second lens group can be manufactured with ease.

According to further another preferred configuration described above, the first lens group includes a negative lens aspherically shaped on both sides thereof and having a concave surface facing the image and a positive meniscus lens aspherically shaped on at least a side thereof facing the object and having a convex surface facing the object, which are disposed in the order from the object side to the image side.

Thus, the zoom lens can be made small while achieving a great angle of view and a great zoom ratio.

According to further another preferred configuration described above, the zoom lens is configured to satisfy the following Conditional Expressions (3), (4) and (5):

$$1.5 < |f2/fw| < 2.5 \quad (3)$$

$$2.0 < |f1/fw| < 3.2 \quad (4)$$

$$0.5 < D2/fw < 1.5 \quad (5)$$

wherein f2 represents the focal length of the second lens group; fw represents the focal length of the entire lens system at the state of the wide angle end; f1 represents the focal length of the first lens group; and D2 represents the thickness of the second lens group measured on the optical axis thereof.

Thus, it is possible to realize a high-performance zoom lens which is compact in size by reducing the entire optical length while achieving a great angle of view and a great zoom ratio.

According to further another preferred configuration described above, the third lens group is configured by a single lens having a focusing function.

Thus, the zoom lens can be made small, in particular, when the zoom lens is applied to a collapsible-barrel type imaging apparatus in which a lens barrel is collapsed and expanded, the zoom lens can reduce the entire length in the collapsed state.

According to further another preferred configuration described above, the above zoom lens is configured to satisfy the following Conditional Expressions (6), (7) and (8):

$$n11 > 1.8 \quad (6)$$

$$n12 > 1.9 \quad (7)$$

$$v12 < 25 \quad (8)$$

wherein n11 represents the refractive index of the negative lens in the first lens group measured using a d-ray, n12 represents the refractive index of the positive meniscus lens in the first lens group measured using a d-ray; and v12 represents the Abbe number of the positive meniscus lens in the first lens group measured using a d-ray.

Thus, the first lens group can be made small as well as chromatic aberration of the entire lens system can be sufficiently corrected.

According to further another preferred configuration described above, the aperture diameter of the stop is not changed during zooming.

Thus, a greater angle of view and a greater zoom ratio can be realized while achieving compactness.

According to further another preferred configuration described above, alignment is performed between a positive lens of the second lens group positioned on the object side and a cemented lens of the second lens group.

Thus, asymmetricity of field curvature occurring in a component assembly process of the positive lens and the cemented lens can be reduced to achieve high resolution performance.

The imaging apparatus according to the embodiment of the invention includes a zoom lens and an imaging device converting an optical image formed by the zoom lens into an electrical signal. The zoom lens includes a first lens group having negative refracting power, a second lens group having positive refracting power, and a third lens group having positive refracting power, disposed in the order from an object side to an image side. During zooming from a wide angle end to a telephoto end, the first lens group is moved and the second lens group is moved together with a stop toward the object such that an air space between the first lens group and the second lens group decreases and such that an air space between the second lens group and the third lens group increases. The second lens group includes a positive lens aspherically shaped on at least a side thereof facing the object and having a convex surface facing the object and a negative lens positioned at the image side of the positive lens, aspherically shaped on at least a side thereof facing the image and having a concave surface facing the image. The imaging apparatus is configured to satisfy the following Conditional Expressions (1) and (2):

$$0.7 < R2f/R2r < 2.0 \quad (1)$$

$$1.0 < |Sga/Sgs| < 1.5 \quad (2)$$

wherein R2f represents a paraxial radius of curvature of the object-facing surface of the positive lens; R2r represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

Thus, it is possible to correct distortion aberrations at the wide angle end and spherical aberrations at the telephoto end efficiently, as a result, the lens can be made small while achieving high optical performance including a great angle of view and a high zoom ratio.

BRIEF DESCRIPTION OF THE DRAWINGS

FIG. 1 shows an embodiment for carrying out an imaging apparatus and a zoom lens according to an embodiment of the invention with FIG. 2 to FIG. 22. FIG. 1 is a conceptual diagram showing states of light flux incident to a second lens group in a wide angle end and a telephoto end respectively;

FIG. 3 shows a spherical aberration, an astigmatic aberration, and a distortion aberration observed when the lens is set at a wide angle end;

FIG. 7 shows a spherical aberration, an astigmatic aberration, and a distortion aberration observed when the lens is set at a wide angle end;

FIG. 11 shows a spherical aberration, an astigmatic aberration, and a distortion aberration observed when the lens is set at a wide angle end;

FIG. 15 shows a spherical aberration, an astigmatic aberration, and a distortion aberration observed when the lens is set at a wide angle end;

FIG. 19 shows a spherical aberration, an astigmatic aberration, and a distortion aberration observed when the lens is set at a wide angle end;

FIG. 21 shows a spherical aberration, an astigmatic aberration, and a distortion aberration observed when the lens is set at a telephoto end; and FIG. 22 is a block diagram showing an imaging apparatus according to an embodiment of the invention.

DESCRIPTION OF THE PREFERRED EMBODIMENTS

Figure 2:
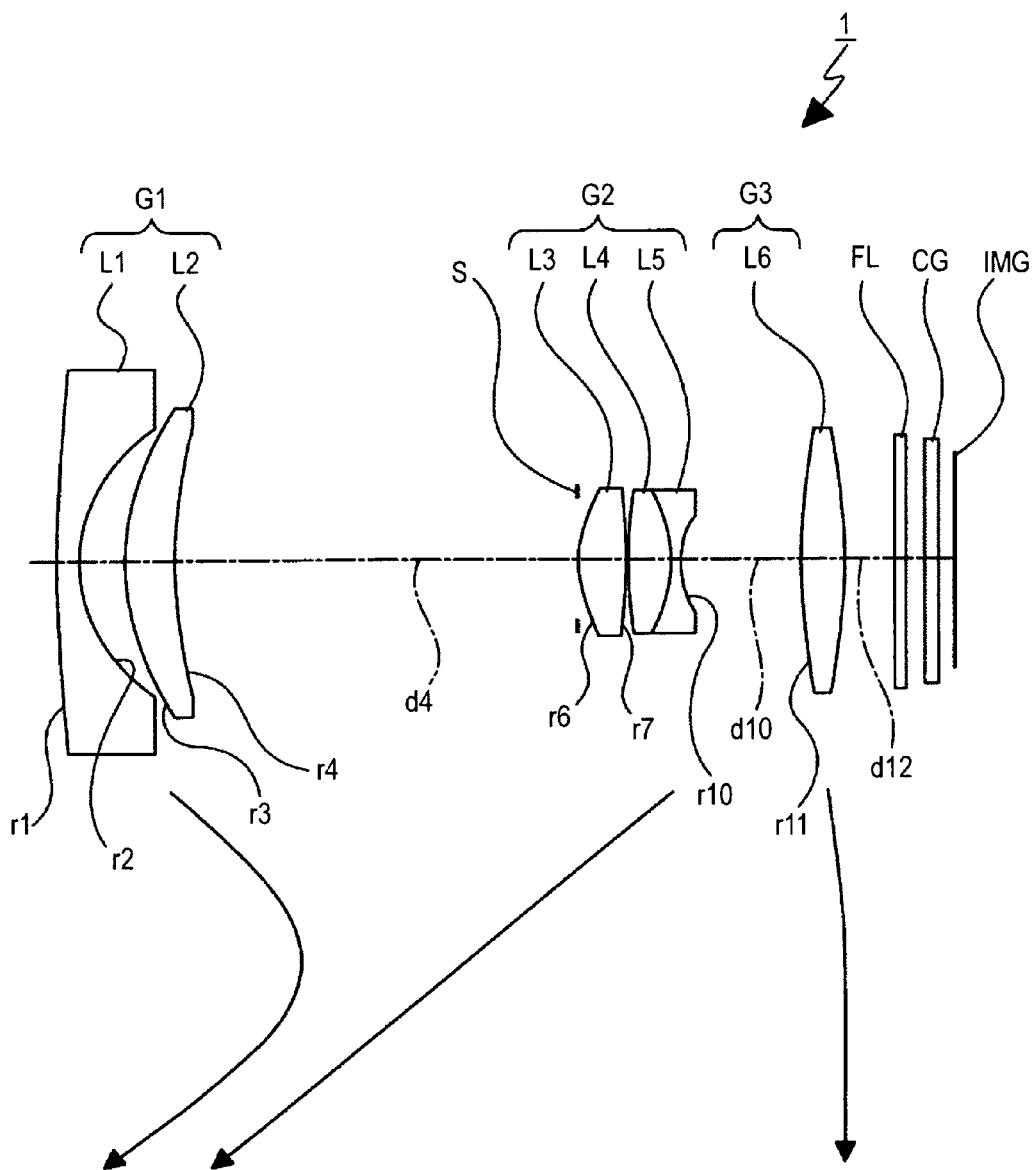
FIG. 2 is an illustration showing a configuration of a zoom lens according to a first embodiment of the invention.

Embodiments of zoom lenses and an imaging apparatus according to the invention will now be described.

First, a zoom lens according to one embodiment of the invention will be described.

The zoom lens according to this embodiment of the invention includes a first lens group having negative refracting power, a second lens group having positive refracting power, and a third lens group having positive refracting power, disposed in the order from an object side to an image side.

During zooming from a wide angle end to a telephoto end of the zoom lens, the first lens group is moved and the second lens group is moved together with a stop toward the object such that the air space between the first lens group and the second lens group decreases and such that the air space between the second lens group and the third lens group increases.

The stop is formed so as to move together with the second lens group, thereby cutting or simplifying a driving mechanism for changing an aperture diameter of the stop, which allows the entire optical length to be reduced.

Particularly, when the zoom lens is applied to a collapsible-barrel type imaging apparatus in which a lens barrel is collapsed and expanded, the zoom lens can reduce the entire length in the collapsed state.

The second lens group in the zoom lens is formed by a positive lens aspherically shaped on at least a side thereof facing the object and having a convex surface facing the object and a negative lens positioned closest to the image side of the positive lens, aspherically shaped on at least a side thereof facing the image and having a concave surface facing the image.

The second lens group is configured to have the positive lens and the negative lens aspherically shaped on respective prescribed surfaces to thereby achieve greater angles of view and greater zoom ratios without increasing the number of lenses in the second lens group.

Particularly, the surface of the negative lens facing the image side is aspherically shaped, which contributes to greater angles of view, greater zoom ratios and compactness.

Advantages of the aspherical surface formed on the surface of the image side of the negative lens in the second lens group will be specifically explained (refer to FIG. 1).

Among the zoom lens of three groups of negative-positive-positive, in the zoom lens system including the positive lens on the object side and the negative lens on the image side in the second lens group, peripheral light flux at the wide angle end and peripheral light flux at the telephoto end are elongated on a surface closest to the image side of the second lens group, namely, on the image facing surface of the negative lens. Solid lines in FIG. 1 represent central light flux and broken lines in FIG. 1 represent peripheral light flux. As shown by A and B in FIG. 1, a position of the peripheral light flux A at the wide angle end and a position of the peripheral light flux B at the telephoto end are elongated in a large scale on the image-facing surface of the negative lens.

In the zoom lens according to the embodiment of the invention, the image-facing surface of the negative lens in the second lens group on which peripheral light flux at the wide angle end and peripheral light flux at the telephoto end are elongated in a large scale is aspherically shaped.

The image-facing surface of the negative lens is aspherically shaped as described above, thereby changing the radius of curvature at the center of the lens in the image-facing surface and the approximate radius of curvature at the periphery in a large scale.

Accordingly, the image-facing surface of the negative lens is aspherically shaped to change the radius of curvature at the center and the approximate radius of curvature at the periphery in a large scale, thereby reducing the number of lenses and achieving greater angles of view and greater zoom ratios, which realizes compactness while securing the greater angles of view and greater zoom ratios.

Particularly, in the case that the zoom lens is applied to a collapsible-barrel type imaging apparatus in which a lens barrel is collapsed and expanded, the entire length in the collapsed state can be reduced.

The zoom lens according to the embodiment of the invention is configured to satisfy the following Conditional Expressions (1) and (2):

$$0.7 < R2f/R2r < 2.0 \quad (1)$$

$$1.0 < |Sga/Sgs| < 1.5 \quad (2)$$

wherein $R2f$ represents a paraxial radius of curvature of the object-facing surface of the positive lens; $R2r$ represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

A sign of "Sga" and "Sgs" will be "−" (minus sign) when the surface shape of the paraxial radius of curvature is closer to the image side than to the aspherical shape, and the sign will be "+" (plus sign) in the converse relation.

The Conditional Expressions (1) is an expression defining the ratio between the radius of curvature of the object-facing surface in the positive lens and the radius of curvature of the image-facing surface in the negative lens.

When the lower limit value of the Conditional Expressions (1) is exceeded, the radius of curvature of the object-facing surface of the positive lens becomes too large or the radius of curvature of the image-facing surface of the negative lens becomes too small. When the radius of curvature of the object-facing surface of the positive lens becomes too large, refracting power of the second lens group becomes too small and it becomes difficult to realize compactness of the zoom lens. Conversely, when the radius of curvature of the image-facing surface of the negative lens becomes too small, aberrations are overcorrected and aberration correction as the second lens group becomes difficult as well as the lens becomes highly sensitive to decentering, as a result, difficulty will be encountered in manufacturing the lens.

On the other hand, when the upper limit value of the Conditional Expressions (1) is exceeded, the radius of curvature of the object-facing surface of the positive lens becomes too small or the radius of curvature of the image-facing surface of the negative lens becomes too large. When the radius of curvature of the object-facing surface of the positive lens becomes too small, aberrations are overcorrected and aberration correction as the second lens group becomes difficult as well as the lens becomes highly sensitive to decentering, as a result, manufacture of the lens becomes difficult. Conversely, the radius of curvature of the image-facing surface of the negative lens becomes too large, refracting power of the second lens group becomes too small and it becomes difficult to realize compactness of the zoom lens.

Therefore, when the zoom lens satisfies Conditional Expression (1), aberrations can be satisfactorily corrected in the second lens group as well as compactness of the zoom lens and manufacturing easiness of respective lenses in the second lens group can be realized.

The Conditional Expressions (2) is an expression defining the aspherical shape formed on the image-facing surface of the negative lens.

When the lower limit value of the Conditional Expressions (2) is exceeded, correction of spherical aberration and coma aberration will be insufficient at an intermediate focal length between the wide angle end and the telephoto end by the aspherical surface formed on the image-facing surface of the negative lens, thus, it is difficult to obtain desired imaging performance.

When the upper limit value of the Conditional Expressions (2) is exceeded, spherical aberration and coma aberration by the aspherical surface formed on the image-facing surface of the negative lens are overcorrected, therefore, the aberration correction as the second lens group will be difficult. Additionally, since the lens becomes highly sensitive to decentering with respect to the object-facing surface of the positive lens, it becomes difficult to manufacture the lens.

Therefore, when the zoom lens satisfies Conditional Expression (2), the image-facing surface of the negative lens will be the aspherical surface in which negative refracting power is increased at the periphery, and the negative lens shares the aberration correction with the positive lens, thereby correcting spherical aberration and coma aberration satisfactorily.

The zoom lens according to the embodiment of the invention is configured so as to satisfy Conditional Expression (1) and Conditional Expression (2) in addition to respective configurations of three groups of negative-positive-positive, thereby realizing compactness while obtaining high optical performance, in which a half-angle of view at the wide angle end exceeds 38 deg and a zoom ratio is 3.8 or more.

In the zoom lens according to the embodiment of the invention, the second lens group is preferably configured so that the positive lens aspherically shaped on at least a side thereof facing the object and having a convex surface facing the object, a positive lens having a convex surface facing the object and a negative lens aspherically shaped on at least a side thereof facing the image and having a concave surface facing the image are arranged in the order from the object side to the image side.

When the second lens group is configured as described above, the second lens group can be formed by a smaller number of lenses, which are three, therefore, the entire optical length can be reduced. In particular, in the case that the zoom lens is applied to a collapsible-barrel type imaging apparatus in which a lens barrel is collapsed and expanded, the zoom lens can reduce the entire length in the collapsed state.

When the second lens group has the above configuration, the principal point of the front side in the second lens group can be made close to the object side, which enables reduction of the entire optical length.

When the material (glass material) of the positive lens positioned on the image side and the negative lens in the second lens group is configured to satisfy the Conditional Expression (9), chromatic aberrations can be satisfactorily corrected:

$$20 < vd22 - vd23 < 50 \quad (9)$$

wherein vd22 represents the Abbe number of the positive lens positioned on the image side in the second lens group measured using a d-ray, and vd23 represents Abbe number of the negative lens in the second lens group measured using a d-ray.

In the zoom lens according to the embodiment of the invention, it is preferable that the second lens group includes a positive lens and a cemented lens disposed in the order from the object side to the image side. The positive lens is aspherically shaped on at least a side thereof facing the image and having a convex surface facing the object. The cemented lens is formed by bonding a positive lens having a convex surface facing the object and a negative lens aspherically shaped on at least a side thereof facing the image and having a concave surface facing the image.

When the second lens group is configured as described above, the second lens group can be formed by a smaller number of lenses, which are three, therefore, the reduction of the entire optical length can be realized. In particular, in the case that the zoom lens is applied to a collapsible-barrel type imaging apparatus in which a lens barrel is collapsed and expanded, the entire length in the collapsed state can be reduced.

When the second lens group has the above configuration, the principal point of the front side in the second lens group can be made close to the object side, which enables reduction of the entire optical length.

Moreover, a cemented lens is formed by bonding a positive lens having a convex surface facing the object and a negative lens aspherically shaped on at least a side thereof facing the image and having a concave surface facing the image, thereby reducing performance deterioration by lens decentering due to manufacturing errors between both lens as well as allowing the lenses in the second lens group to be manufactured with ease.

When the material (glass material) of the positive lens positioned on the image side and the negative lens in the second lens group is configured to satisfy the Conditional Expression (10), chromatic aberrations can be satisfactorily corrected:

$$5 < vd22 - vd23 < 25 \quad (10)$$

wherein vd22 represents the Abbe number of the positive lens positioned on the image side in the second lens group measured using a d-ray, and vd23 represents Abbe number of the negative lens in the second lens group measured using a d-ray.

In the zoom lens according to the embodiment of the invention, it is preferable that the first lens group includes a negative lens aspherically shaped on both sides thereof and having a concave surface facing the image and a positive meniscus lens aspherically shaped on at least a side thereof facing the object and having a convex surface facing the object, disposed in the order from the object side to the image side.

In the zoom lens of three groups of negative-positive-positive, peripheral light flux at the wide angle end and peripheral light flux at the telephoto end are elongated also on both surfaces of the negative lens positioned at the position closest to the object side in the first lens group, in addition to the surface closest to the image side of the second lens group as described above.

Accordingly, the object-facing surface of the positive meniscus lens is aspherically shaped in addition to the both surface of the negative lens in the first lens group, thereby changing the radius of curvature at the center of the lens and the approximate radius of curvature at the periphery in a large scale, as a result, aberration correction can be satisfactorily performed.

It is possible therefore to correct a distortion aberration and an astigmatic aberration at the wide angle end which are not be completely corrected by the negative lens of the first lens group in a well-balanced manner. Since the positive meniscus lens is aspherically shaped on a side thereof facing the object, it is possible to satisfactorily correct spherical aberrations occurring at the telephoto end when the lens has a great zoom ratio.

Thus, the first lens group is formed by two lenses having aspherical surfaces as described above, it is possible to efficiently correct a distortion aberration and an astigmatic aberration at the wide angle end which were not be completely corrected by the related art. In particular, in the case that the zoom lens is applied to a collapsible-barrel type imaging apparatus in which a lens barrel is collapsed and expanded, the entire length in the collapsed state can be reduced.

Preferably, the zoom lens according to the embodiment of the invention is configured to satisfy the following Conditional Expressions (3), (4) and (5):

$$1.5 < |f2/fw| < 2.5 \quad (3)$$

$$2.0 < |f1/fw| < 3.2 \quad (4)$$

$$0.5 < D2/fw < 1.5 \quad (5)$$

wherein f2 represents the focal length of the second lens group; fw represents the focal length of the entire lens system at the state of the wide angle end; f1 represents the focal length of the first lens group; and D2 represents the thickness of the second lens group measured on the optical axis thereof.

The Conditional Expression (3) is an expression defining the ratio between the focal length of the second lens group and the focal length of the entire lens system at the state of the wide angle end.

When the lower limit value of the Conditional Expressions (3) is exceeded, the focal length of the second lens group will become too short, and the amounts of aberrations occurring at the second lens group will be large, thus, it is difficult to form the second lens group by three lenses and the second lens group will be large in size.

On the other hand, when the upper limit value of the Conditional Expressions (3) is exceeded, the focal length of the second lens group becomes too long, therefore, the moving distance of the second lens group becomes long and the entire optical length also becomes long, thus, it becomes difficult to achieve compactness.

Therefore, when the zoom lens satisfies Conditional Expression (3), it is possible to suppress the occurrence of aberrations at the second lens group as well as the lens can be made compact by the reducing of the entire optical length.

The Conditional Expression (4) is an expression defining the ratio between the focal length of the first lens group and the focal length of the entire lens system at the state of the wide angle end.

When the lower limit value of the Conditional Expressions (4) is exceeded, the focal length of the first lens group will become too short, and the amounts of aberrations occurring at the first lens group will be large as well as the lens becomes highly sensitive to decentering, as a result, mass-productivity will be reduced.

On the other hand, when the upper limit value of the Conditional Expressions (4) is exceeded, the focal length of the first lens group becomes too long, therefore, it becomes difficult to achieve a great angle of view and the reduction of the entire optical length may be hindered.

Therefore, when the zoom lens satisfies Conditional Expression (4), it is possible to suppress the occurrence of aberrations at the first lens group as well as mass-productivity of the lenses can be improved and the entire optical length can be reduced.

The Conditional Expression (5) is an expression defining the ratio between the thickness of the second lens group measured on the optical axis thereof and the focal length of the entire lens system at the state of the wide angle end.

When the lower limit value of the Conditional Expressions (5) is exceeded, in the case that the zoom lens is applied to a collapsible-barrel type imaging apparatus, the reduction of the length in the collapsed state can be realized, however, the focal length of the second lens group becomes long, as a result, the entire optical lens will be long.

On the other hand, when the upper limit value of the Conditional Expressions (5) is exceeded, the thickness of the second lens group is increased and it is difficult to reduce the length of the collapsed lens barrel when the zoom lens is applied to a collapsible-barrel type imaging apparatus, which can be an obstacle to reduce the entire optical length.

Therefore, when the zoom lens satisfies Conditional Expression (5), it is possible to make the lens compact by reducing the entire optical length.

When the zoom lens satisfies Conditional Expression (3), (4) and (5), the high-performance zoom lens can be provided with a small size by reducing the entire optical length as well as with a greater angle of view and a greater zoom ratio.

The zoom lens according to the embodiment of the invention may be configured to satisfy the following Conditional Expressions (3)' and (4)' respectively, instead of Conditional Expressions (3) and (4) described above.

$$1.9<|f2/fw|<2.4 \quad (3)'$$

$$2.4<|f1/fw|<3.0 \quad (4)'$$

When the zoom lens satisfies Conditional Expression (3)' and (4)', it is possible to further reduce the entire optical length.

In the zoom lens according to the embodiment of the invention, it is preferable that the third lens group is configured by a single lens having a focusing function.

When the third lens group is configured by a single lens having the focusing function, the third lens group is likely to interfere with a control system for driving and controlling a shutter unit and an iris unit and interfere with an anti-vibration driving system for shifting the lens group. Therefore, the size of the zoom lens can be reduced, in particular, in the case that the zoom lens is applied to a collapsible-barrel type imaging apparatus in which a lens barrel is collapsed and expanded, the reduction of the entire length in the collapsed state can be realized.

Preferably, the zoom lens according to the embodiment of the invention is configured to satisfy the following Conditional Expressions (6), (7) and (8):

$$n11>1.8 \quad (6)$$

$$n12>1.9 \quad (7)$$

$$v12<25 \quad (8)$$

wherein n11 represents the refractive index of the negative lens in the first lens group measured using a d-ray, n12 represents the refractive index of the positive meniscus lens in the first lens group measured using a d-ray; and v12 represents the Abbe number of the positive meniscus lens in the first lens group measured using a d-ray.

Conditional Expressions (6), (7) and (8) are expression defining the refractive index of the negative lens in the first lens group, the refractive index of the positive lens and the Abbe number of the positive lens.

When the lower limit value of the Conditional Expression (6) is exceeded, it is desirable to decrease the radius of curvature of the image-facing surface of the negative lens. Otherwise, degradation of optical performance may be caused by difficulty in correcting field curvature at the wide angle end, and difficulty will be encountered in manufacture performance due to increase of the thickness deviation ratio (ratio between thickness at the center and thickness around effective aperture) of the negative lens.

Therefore, when the zoom lens satisfies Conditional Expression (6), it is possible to improve optical performance and allow the manufacture of the negative lens to be easier.

When the lower limit value of Conditional Expression (7) is exceeded, it is desirable to increase the radius of curvature of the positive meniscus lens. Otherwise, degradation of optical performance may be caused by difficulty in correcting field curvature at the wide angle end, and difficulty will be encountered in manufacturing the positive meniscus lens because of difficulty in maintaining a sufficient edge thickness.

Therefore, when the zoom lens satisfies Conditional Expression (7), it is possible to improve optical performance and allow the manufacture of the positive meniscus lens to be easier.

When the upper limit value of Conditional Expressions (8) is exceeded, degradation of optical performance may be caused by difficulty in correcting chromatic aberrations occurring in the first lens group.

Therefore, when the zoom lens satisfies Conditional Expressions (8), it is possible to correct chromatic aberrations occurring in the first lens group satisfactorily and to improve optical performance.

In the zoom lens according to the embodiment of the invention, it is preferable that the aperture diameter of the stop is configured so as not to be changed during zooming.

When the aperture diameter of the stop is not changed during zooming, it is possible to cut or simplify the driving mechanism for changing the aperture diameter of the stop, thereby reducing the entire length as well as achieving compactness.

In the configuration of the zoom lens according to the embodiment of the invention, in which the second lens group includes a positive lens and a cemented lens formed by bonging a positive lens and a negative lens, disposed in the order from the object side to the image side, it is desirable that alignment of the positive lens positioned at the object side and the cemented lens is performed.

In the second lens group, the object-facing surface of the positive lens positioned closest to the object is aspherically shaped and the image-facing surface of the negative lens is aspherically shaped, which is the configuration in which aberration correction effects are shared between the object-facing surface closest to the object and the image-facing surface closest to the image in the second lens group. Therefore, the lens becomes highly sensitive to decentering with respect to the object-facing surface closest to the object and the image-facing surface closest to the image sharing the aberration correction effects.

Accordingly, in the zoom lens according to the embodiment of the invention, alignment is performed between the positive lens positioned at the object side and the cemented lens, or between the positive lens positioned at the object side and the negative lens at the time of manufacture, thereby suppressing deterioration of resolution performance with respect to component tolerance and manufacturing tolerance can be suppressed, which realizes high resolution performance.

An image formed by the zoom lens according to the embodiment of the invention can be shifted by moving (shifting) one of the first to third lens groups or a part of the lens group in a direction substantially perpendicular to the optical axis thereof. Such a function of allowing a lens group or a part of the lens group to be moved in a direction substantially perpendicular to the optical axis thereof can be combined with a detection system for detecting image blur, a driving system for shifting each lens group, and a control system for supplying a shift amount to the driving system based on an output from the detection system. Thus, the zoom lens can be provided with the function of an anti-vibration optical system. In particular, the image can be shifted with small aberration variation by shifting the entire second lens group in the direction substantially perpendicular to the optical axis thereof in the zoom lens according to the embodiment of the invention.

Next, embodiments of the zoom lens according to the embodiment of the invention and examples of numerical values used in the embodiments will now be specifically described with reference to the drawings and tables.

Symbols used in the following tables and description have meanings as described below.

"si" represents a surface number assigned to a surface in an i-th place counted from the object side to the image side. "ri" represents radius of curvature of the surface in the i-th place (i-th surface). "ASP" represents an aspherical surface and "di" represents an axial surface distance between the i-th surface and a surface in an (i+1)-th place. "ni" represents the refractive index of the material of the lens including the i-th surface measured using a d-ray (having a wavelength of 587.6 nm). "vi" represents the Abbe number of the material of the lens including the i-th surface measured using the d-ray. A surface number accompanied by "S" indicates a stop, and "IMG" represents an image plane. A radius of curvature accompanied by "INF" indicates that the curvature of the surface of interest is infinity. The axial surface distance accompanied by "variable" indicates a variable distance.

Lenses used for describing example of numerical values include lenses having aspherically shaped lens surfaces. An aspheric shape is defined by Equation 1 shown below.

$$x = \frac{c \cdot y^2}{1 + \{1 - (1+K) \cdot c^2 \cdot y^2\}^{1/2}} + \sum A_i \cdot y^i$$

In Equation 1, "x" represents the distance of the shape from an apex of a lens surface in a direction along the optical axis; "y" represents the height of the shape in a direction perpendicular to the optical axis; "c" represents a paraxial curvature at the apex of the lens (the inverse of the radius of curvature); "K" represents a conic constant; and "Ai" represents an i-th order aspheric coefficient.

First to fifth embodiments of the invention will now be described below (refer to FIG. 2 to FIG. 21).

Any of zoom lenses according to the first to fifth embodiments of the invention includes a first lens group having negative refracting power, a second lens group having positive refracting power, and a third lens group having positive refracting power, which are disposed in the order from an object side to an image side. When any of the zoom lenses according to the first to fifth embodiments of the invention zooms from the wide angle end to the telephoto end, the first lens group is moved as well as the second lens group is moved together with the stop toward the object such that an air space between the first lens group and the second lens group decreases and such that an air space between the second lens group and the third lens group increases.

FIG. 2 is an illustration showing a configuration of a zoom lens 1 according to the first embodiment of the invention.

As shown in FIG. 2, the zoom lens 1 of the first embodiment includes six lenses.

The zoom lens 1 includes a first lens group G1 having negative refracting power, a second lens group G2 having positive refracting power, and a third lens group G3 having positive refracting power which are disposed in the order from the object side to the image side.

The first lens group G1 includes a first lens L1 and a second lens L2 disposed in the order from the object side to the image side. The first lens L1 is a negative meniscus lens which is aspherically shaped on both sides thereof and which includes a convex surface facing the object. The second lens L2 is a positive meniscus lens which is aspherically shaped on both sides and which includes a convex surface facing the object.

The second lens group G2 includes a third lens L3 and a cemented lens which are disposed in the order from the object side to the image side. The third lens L3 is a double convex lens aspherically shaped on both sides thereof. The cemented lens is formed by bonding a fourth lens L4 which is a double convex lens and a fifth lens L5 which is a double concave lens aspherically shaped on a side thereof facing the image.

The third lens group G3 is constituted by a sixth lens L6 which is a double convex lens aspherically shaped on a side thereof facing the object.

A stop S (a stop surface r5) is disposed between the first lens group G1 and the second lens group G2.

Between the third lens group G3 and an image plane IMG, a filter FL and a cover glass CG are disposed in the order from the object side to the image side.

Table 1 shows lens data which is Example 1 of specific numerical values used in the zoom lens 1 according to the first embodiment of the invention.

TABLE 1

| si | ri | ASP | di | ni | vi |
|---|---|---|---|---|---|
| 1 | 50.000 | ASP | 0.800 | 1.85135 | 40.10 |
| 2 | 5.108 | ASP | 1.739 | | |
| 3 | 8.5376 | ASP | 1.862 | 2.00178 | 19.30 |
| 4 | 15.0429 | ASP | variable | | |
| 5 (S) | INF | | 0.000 | | |
| 6 | 4.9290 | ASP | 1.700 | 1.62263 | 58.16 |
| 7 | −27.333 | ASP | 0.100 | | |
| 8 | 17.071 | | 1.600 | 1.83481 | 42.72 |
| 9 | −5.187 | | 0.400 | 1.68893 | 31.16 |
| 10 | 4.413 | ASP | variable | | |
| 11 | 24.193 | ASP | 1.550 | 1.76802 | 49.24 |
| 12 | −26.664 | | variable | | |
| 13 | INF | | 0.300 | 1.51680 | 64.20 |
| 14 | INF | | 0.720 | | |
| 15 | INF | | 0.500 | 1.56883 | 56.04 |
| 16 | INF | | 0.600 | | |
| 17 (IMG) | INF | | 0.000 | | |

In the zoom lens 1, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r6) of the third lens L3 of the second lens group G2, an image-facing surface (r7) of the third lens L3 of the second lens group G2, an image-facing surface (r10) of the fifth lens L5 of the second lens group G2, and an object-facing surface (r11) of the sixth lens L6 of the third lens group G3 are aspherically shaped. Table 2 shows fourth-order aspheric coefficients A4, sixth-order aspheric coefficients A6, eighth-order aspheric coefficients A8, and tenth-order aspheric coefficients A10 of the aspheric surfaces associated with Example 1 of numerical values along with conic constants K.

In Table 2 and each of tables showing aspheric coefficients which will be described later, notation "E-i" represents a base-10 exponential or stands for "$10^{-i}$". For example, "0.12345E-05" stands for "$0.12345\times10^{-5}$".

TABLE 2

| si | K | A4 | A6 | A8 | A10 |
|---|---|---|---|---|---|
| 1 | 6.4587E+00 | −5.1726E−05 | 4.6660E−06 | −1.5055E−07 | 1.1104E−09 |
| 2 | −5.2800E−01 | −6.7050E−04 | 5.7858E−05 | −1.6307E−06 | 6.9904E−09 |
| 3 | 3.7220E−01 | −1.0103E−03 | 4.7777E−05 | −1.7470E−06 | 2.2124E−08 |
| 4 | −4.5358E+00 | −6.1371E−04 | 3.4761E−05 | −1.5027E−06 | 2.2902E−08 |
| 6 | 3.4259E−01 | −1.4084E−03 | −1.0807E−04 | −1.3862E−06 | −1.2258E−06 |
| 7 | 2.8708E+01 | −4.3244E−04 | −1.9578E−05 | −6.6201E−06 | −4.4260E−07 |
| 10 | 8.6262E−01 | 1.4897E−03 | 5.3930E−05 | 0.0000E+00 | 0.0000E+00 |
| 11 | 0.0000E+00 | −3.2626E−04 | 2.3407E−05 | −9.2323E−07 | 1.3987E−08 |

During zooming of the zoom lens 1 between the wide angle end and the telephoto end, changes occur in a surface distance d4 between the first lens group G1 and the stop S, a surface distance d10 between the second lens group G2 and the third lens group G3, and a surface distance d12 between the third lens group G3 and the filter FL. Table 3 shows the amounts of changes in each surface distance that can occur when the lens having numerical values of Example 1 is set at the wide angle end (at a focal length f of 4.37), when the lens is set at an intermediate focal length (at a focal length f of 9.51), and when the lens is set at the telephoto end (at a focal length f of 20.57). The amounts of changes are shown along with F-numbers Fno and half-angles of view ω.

TABLE 3

| | f | | |
|---|---|---|---|
| | 4.37 | 9.51 | 20.57 |
| Fno | 2.46 | 3.63 | 6.08 |
| ω | 42.88 | 22.03 | 10.42 |
| d4 | 15.096 | 5.305 | 0.547 |
| d10 | 4.441 | 10.273 | 21.729 |
| d12 | 1.966 | 1.599 | 1.636 |

In the zoom lens 1, focal lengths of the first lens group G1, the second lens group G2 and the third lens group G3 are shown in Table 4.

TABLE 4

| | focal length |
|---|---|
| first lens group | −11.762 |
| second lens group | 9.319 |
| third lens group | 16.657 |

Figure 3:
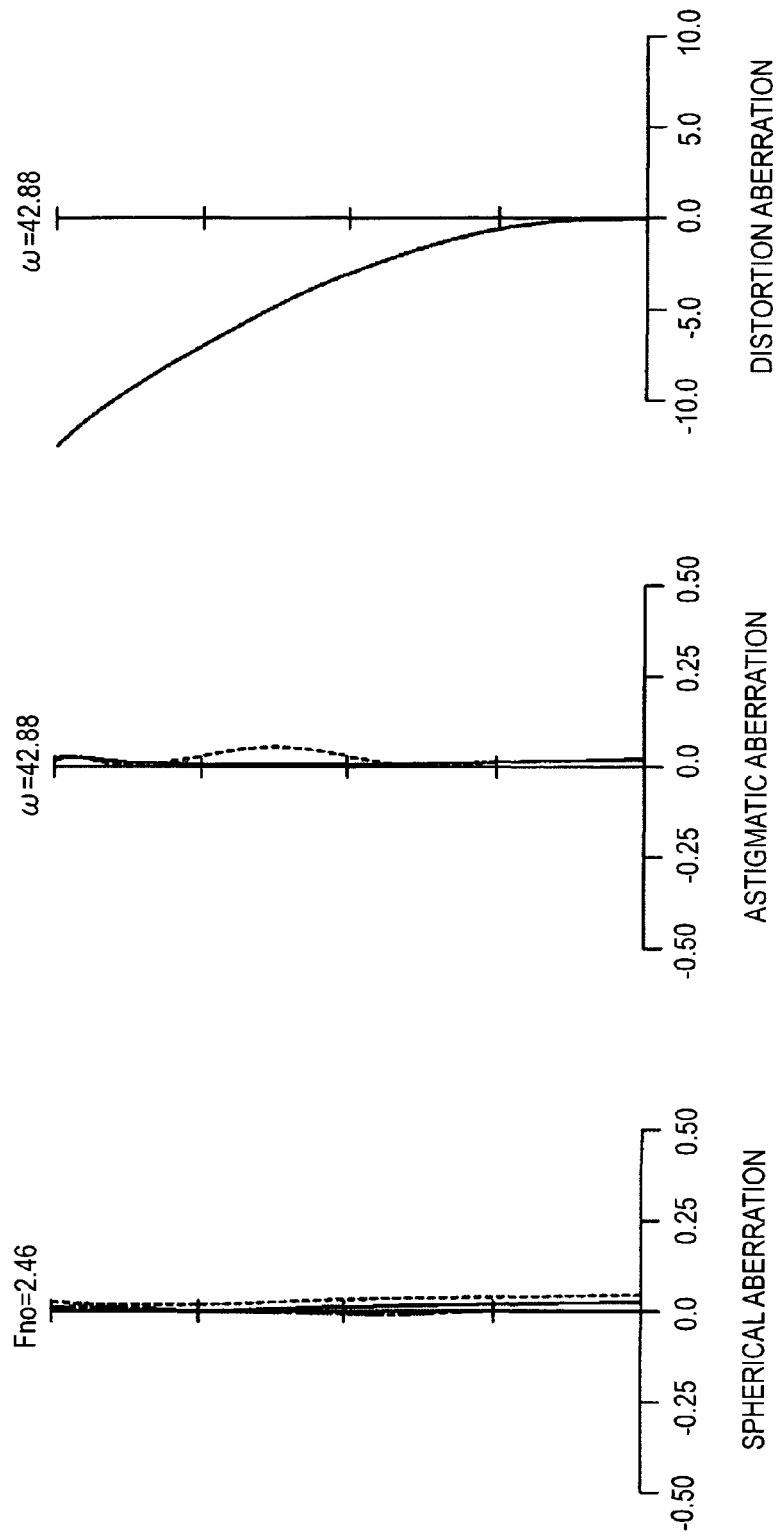
FIG. 3 shows aberration diagrams obtained using an example of specific numerical values applied to the first embodiment with FIG. 4 and FIG. 5.
Figure 4:
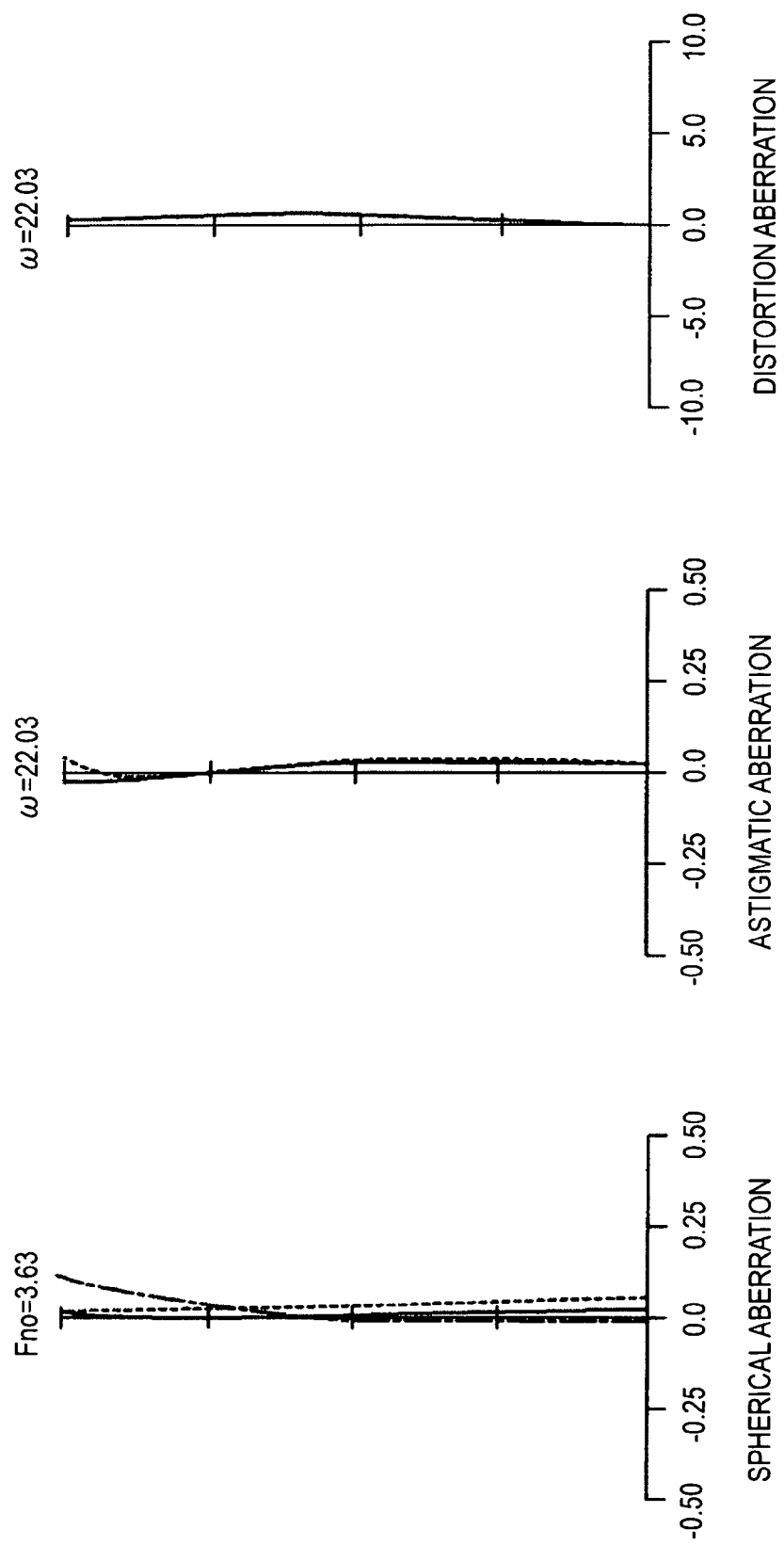
FIG. 4 shows a spherical aberration, an astigmatic aberration, and a distortion aberration observed when the lens is set at an intermediate focal length.
Figure 5:
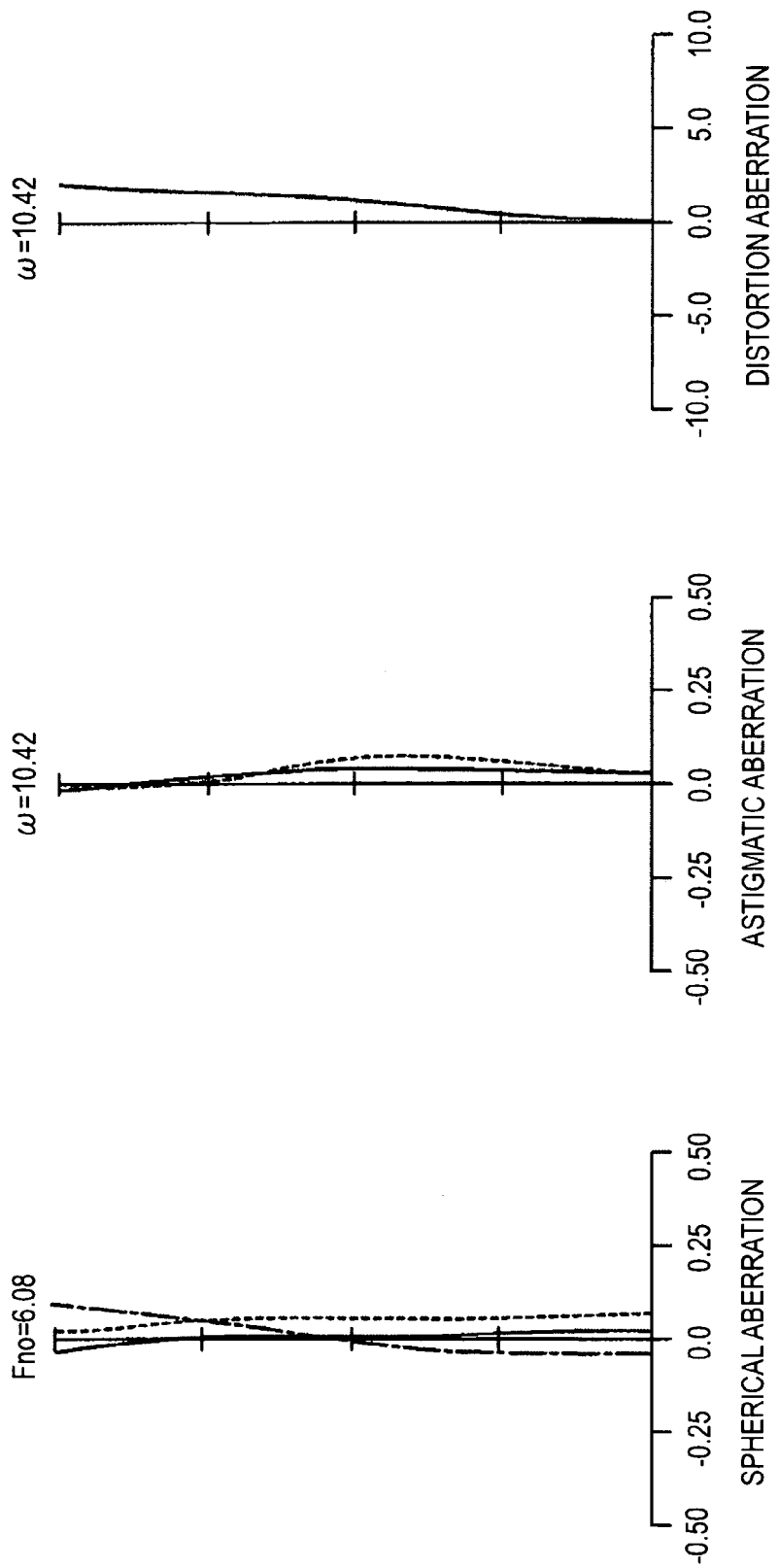
FIG. 5 shows a spherical aberration, an astigmatic aberration, and a distortion aberration observed when the lens is set at a telephoto end.

FIGS. 3 to 5 show various aberrations encountered when the lens having the numerical values of Example 1 is focused at infinity. FIG. 3 shows aberrations encountered when the lens is set at the wide angle end (at the focal length f of 4.37). FIG. 4 shows aberrations encountered when the lens is set at the intermediate focal length (at the focal length f of 9.51). FIG. 5 shows aberrations encountered when the lens is set at the telephoto end (at the focal length f of 20.57).

In the spherical aberration diagrams shown in FIGS. 3 to 5, solid lines represent values measured using a d-ray (having a wavelength of 587.6 nm), dotted lines represent values measured using a c-ray (having a wavelength of 656.3 nm), chain lines represent values measured by using a g-ray (having a wavelength of 435.8 nm). In the astigmatic aberration diagrams shown in FIGS. 3 to 5, solid lines represent values measured on a sagittal plane, and broken lines represent values measured on a meridional plane.

It is obvious from the aberration diagrams that aberrations can be satisfactorily corrected to achieve high imaging performance by the numerical values of Example 1.

Figure 6:
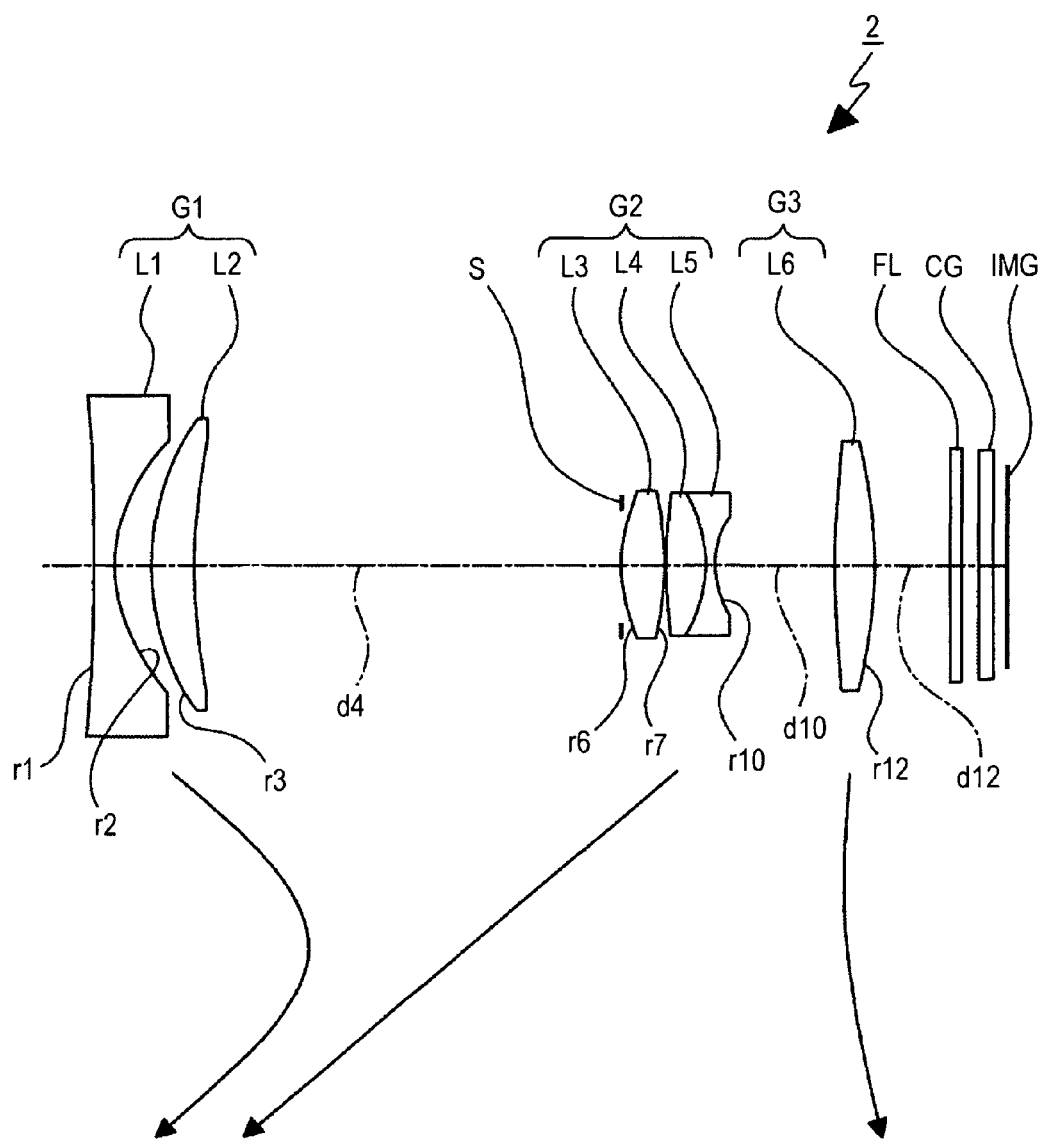
FIG. 6 is an illustration showing a configuration of a zoom lens according to a second embodiment of the invention.

FIG. 6 is an illustration showing a configuration of a zoom lens 2 according to a second embodiment of the invention.

As shown in FIG. 6, the zoom lens 2 of the second embodiment includes six lenses.

The zoom lens 2 includes a first lens group G1 having negative refracting power, a second lens group G2 having positive refracting power, and a third lens group G3 having positive refracting power, which are disposed in the order from the object side to the image side.

The first lens group G1 includes a first lens L1 and a second lens L2 disposed in the order from the object side to the image side. The first lens L1 is a double concave lens aspherically shaped on both sides thereof. The second lens is a positive meniscus lens which is aspherically shaped on a side thereof facing the object and which includes a convex surface facing the object.

The second lens group G2 includes a third lens L3 and a cemented lens which are disposed in the order from the object side to the image side. The third lens is a double convex lens which is aspherically shaped on both sides thereof. The cemented lens is formed by bonding a fourth lens L4 which is a double convex lens and a fifth lens L5 which is a double concave lens aspherically shaped on a side thereof facing the image.

The third lens group G3 is constituted by a sixth lens L6 which is a double convex lens aspherically shaped on a side thereof facing the image.

A stop S (a stop surface r5) is disposed between the first lens group G1 and the second lens group G2.

Between the third lens group G3 and an image plane IMG, a filter FL and a cover glass CG are disposed in the order from the object side to the image side.

Table 5 shows lens data which is Example 2 of specific numerical values used in the zoom lens 2 according to the second embodiment of the invention.

TABLE 5

| si | ri | ASP | di | ni | vi |
|---|---|---|---|---|---|
| 1 | 214.861 | ASP | 0.856 | 1.83441 | 37.29 |
| 2 | 6.216 | ASP | 1.440 | | |
| 3 | 11.5062 | ASP | 1.676 | 2.00178 | 19.30 |
| 4 | 27.5092 | | variable | | |
| 5 (S) | INF | | 0.000 | | |
| 6 | 6.066 | ASP | 1.599 | 1.69350 | 53.20 |
| 7 | −18.570 | ASP | 0.100 | | |
| 8 | 20.914 | | 1.508 | 1.84840 | 42.34 |
| 9 | −5.878 | | 0.400 | 1.68893 | 31.16 |
| 10 | 4.322 | ASP | variable | | |
| 11 | 38.250 | | 1.614 | 1.58313 | 59.46 |
| 12 | −14.779 | ASP | variable | | |
| 13 | INF | | 0.300 | 1.51680 | 64.20 |
| 14 | INF | | 0.720 | | |
| 15 | INF | | 0.500 | 1.56883 | 56.04 |
| 16 | INF | | 0.600 | | |
| 17 (IMG) | INF | | 0.000 | | |

In the zoom lens 2, an object-facing surface (r1) of the first lens L1 of the first lens group G1, an image-facing surface (r2) of the first lens L1 of the first lens group G1, an object-facing surface (r3) of the second lens L2 of the first lens group G1, an object-facing surface (r6) of the third lens L3 of the second lens group G2, an image-facing surface (r7) of the third lens L3 of the second lens group G2, an image-facing surface (r10) of a fifth lens L5 of the second lens group G2, and an image-facing surface (r12) of a sixth lens L6 of the third lens group G3 are aspherically shaped. Table 6 shows fourth-order aspheric coefficients A4, sixth-order aspheric coefficients A6, eighth-order aspheric coefficients A8, and tenth-order aspheric coefficients A10 of the aspheric surfaces associated with Example 2 of numerical values along with conic constants K.

TABLE 6

| si | K | A4 | A6 | A8 | A10 |
|---|---|---|---|---|---|
| 1 | 2.0000E+01 | −5.7710E−04 | 2.1678E−05 | −3.6784E−07 | 2.2661E−09 |
| 2 | −6.3006E−01 | −3.6169E−04 | −4.5452E−06 | 9.5439E−07 | −1.9289E−08 |
| 3 | 5.8272E−01 | 1.8111E−04 | −1.6609E−05 | 6.0704E−07 | −7.7970E−09 |
| 6 | 7.4255E−01 | −1.4640E−03 | −7.7795E−05 | −1.3862E−06 | −1.2258E−06 |
| 7 | −1.8912E+01 | −3.2424E−04 | −5.7153E−05 | −6.6201E−06 | −4.4260E−07 |
| 10 | 0.0000E+00 | 2.0465E−04 | 8.2300E−05 | 0.0000E+00 | 0.0000E+00 |
| 12 | 4.1053E+00 | 7.1804E−04 | −2.0675E−05 | 7.9620E−07 | −1.0518E−08 |

During zooming of the zoom lens 2 between the wide angle end and the telephoto end, changes occur in a surface distance d4 between the first lens group G1 and the stop S, a surface distance d10 between the second lens group G2 and the third lens group G3, and a surface distance d12 between the third lens group G3 and the filter FL. Table 7 shows the amounts of changes in each surface distance that can occur when the lens having the numerical values of Example 2 is set at the wide angle end (at a focal length f of 5.10), when the lens is set at an intermediate focal length (at a focal length f of 10.58), and when the lens is set at the telephoto end (at a focal length f of 21.93). The amounts of changes are shown along with F-numbers Fno and half-angles of view ω.

TABLE 7

| | f | | |
|---|---|---|---|
| | 5.10 | 10.58 | 21.93 |
| Fno | 2.59 | 3.64 | 5.96 |
| ω | 38.85 | 19.97 | 9.76 |
| d4 | 16.630 | 5.672 | 0.880 |
| d10 | 4.600 | 10.211 | 22.308 |
| d12 | 2.999 | 3.109 | 1.900 |

In the zoom lens 2, focal lengths of the first lens group G1, the second lens group G2 and the third lens group G3 are shown in Table 8.

TABLE 8

| | focal length |
|---|---|
| first lens group | −14.103 |
| second lens group | 10.565 |
| third lens group | 18.415 |

Figure 7:
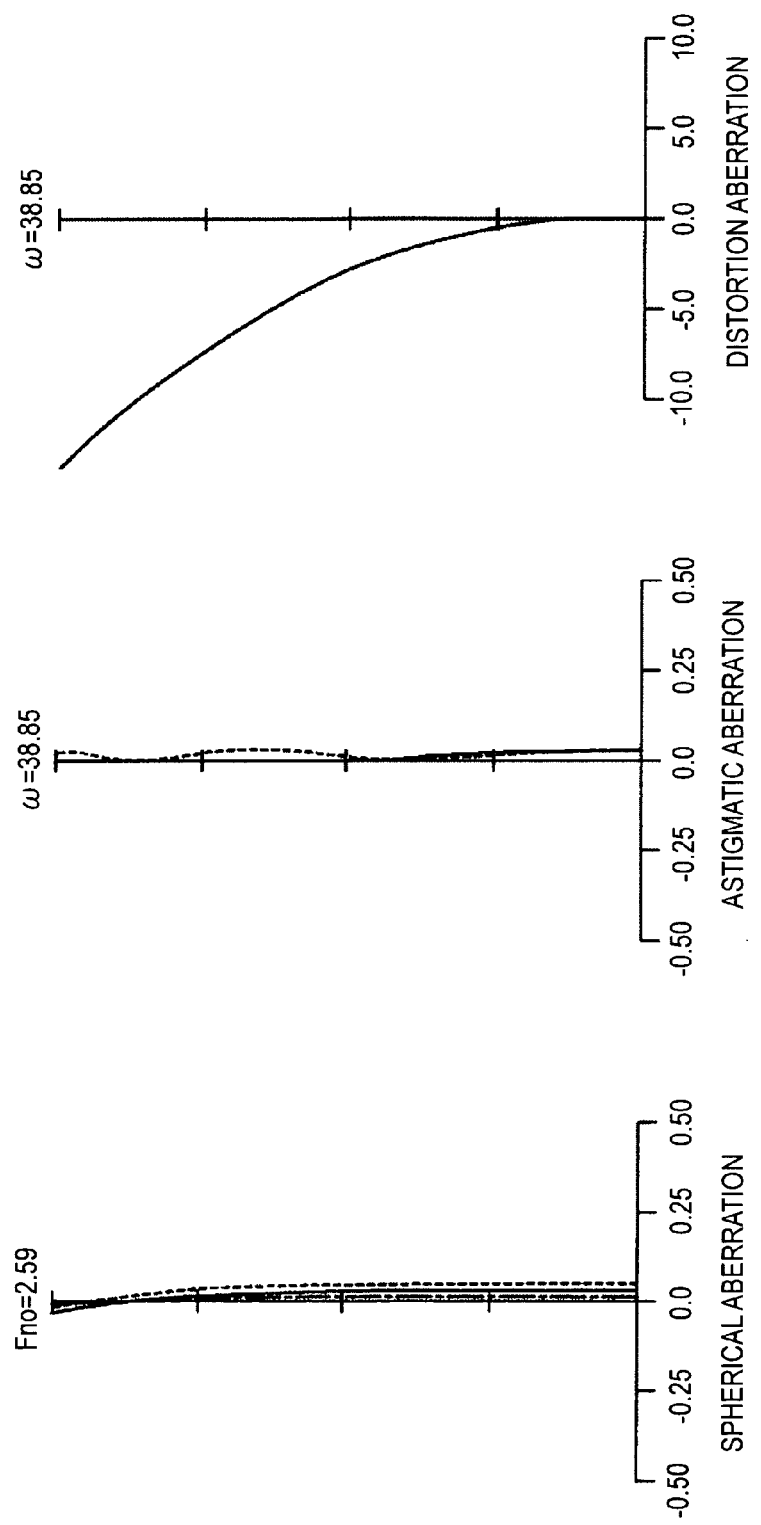
FIG. 7 shows aberration diagrams obtained using an example of specific numerical values applied to the second embodiment with FIG. 8 and FIG. 9.
Figure 8:
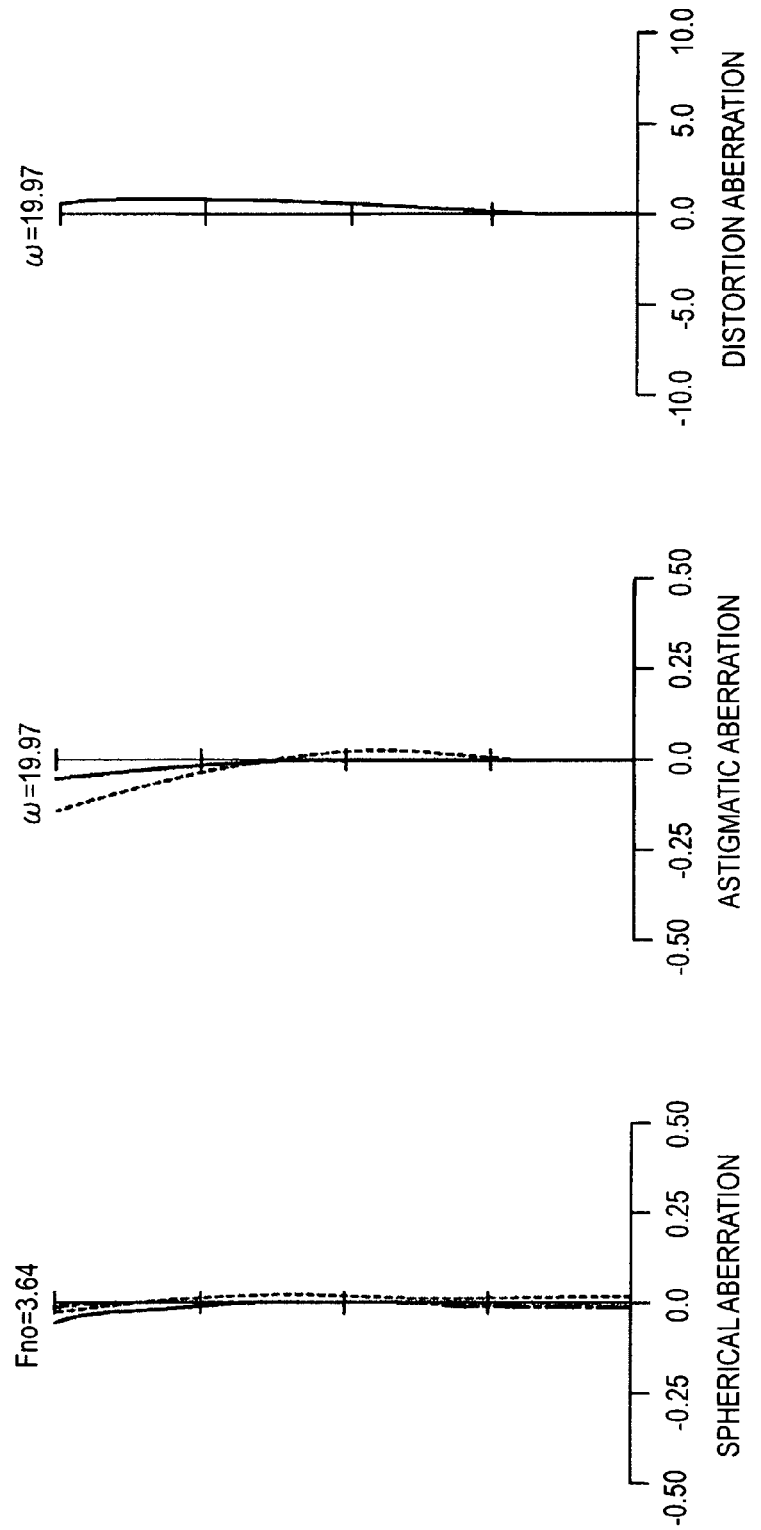
FIG. 8 shows a spherical aberration, an astigmatic aberration, and a distortion aberration observed when the lens is set at an intermediate focal length.
Figure 9:
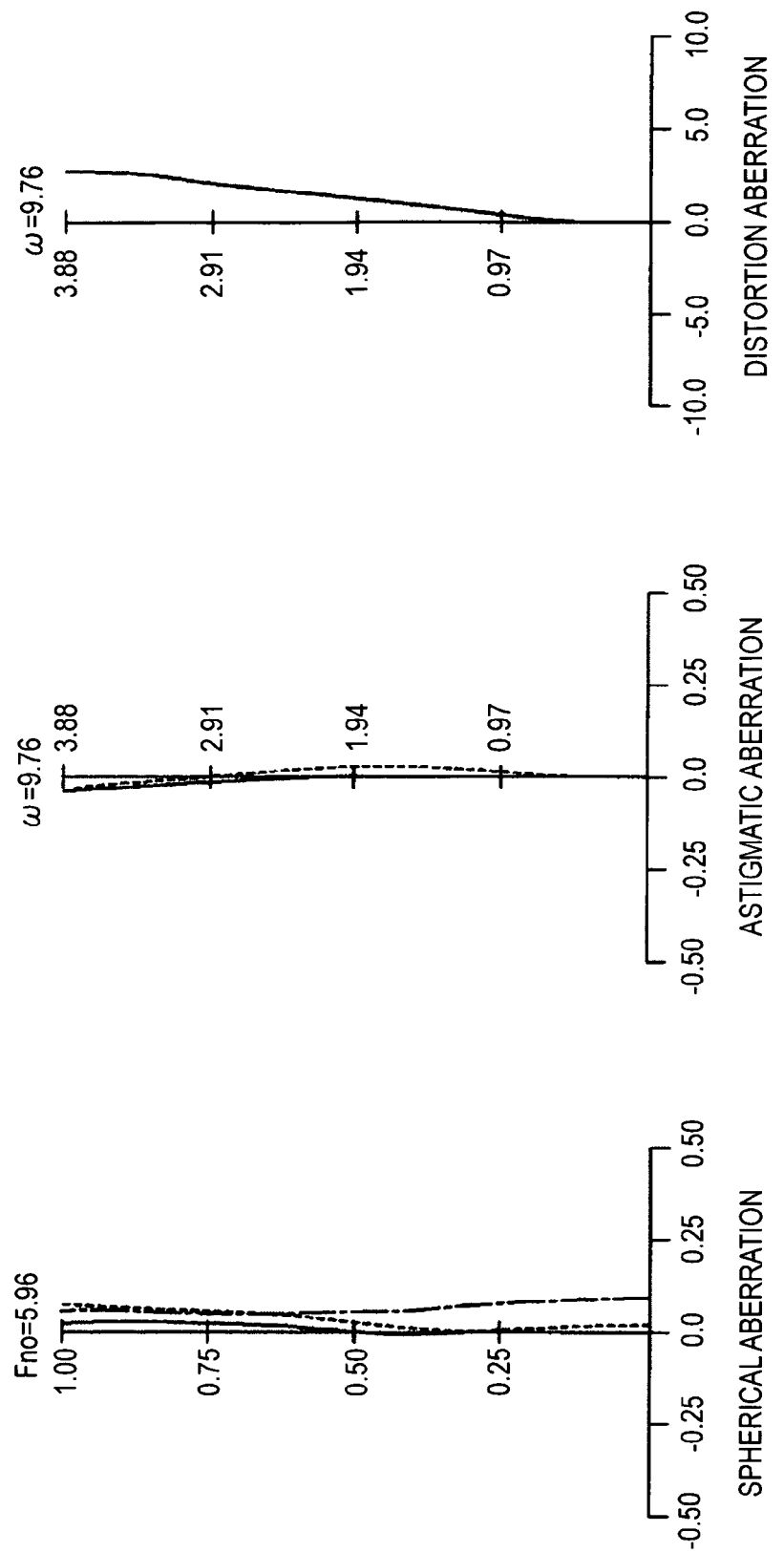
FIG. 9 shows a spherical aberration, an astigmatic aberration, and a distortion aberration observed when the lens is set at a telephoto end.

FIGS. 7 to 9 show various aberrations encountered when the lens having the numerical values of Example 2 is focused at infinity. FIG. 7 shows aberrations encountered when the lens is set at the wide angle end (at the focal length f of 5.10). FIG. 8 shows aberrations encountered when the lens is set at the intermediate focal length (at the focal length f of 10.58). FIG. 9 shows aberrations encountered when the lens is set at the telephoto end (at the focal length f of 21.93).

In the spherical aberration diagrams shown in FIGS. 7 to 9, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 7 to 9, solid lines represent values measured on a sagittal plane, and broken lines represent values measured on a meridional plane.

It is obvious from the aberration diagrams that aberrations can be satisfactorily corrected to achieve high imaging performance by the numerical values of Example 2.

Figure 10:
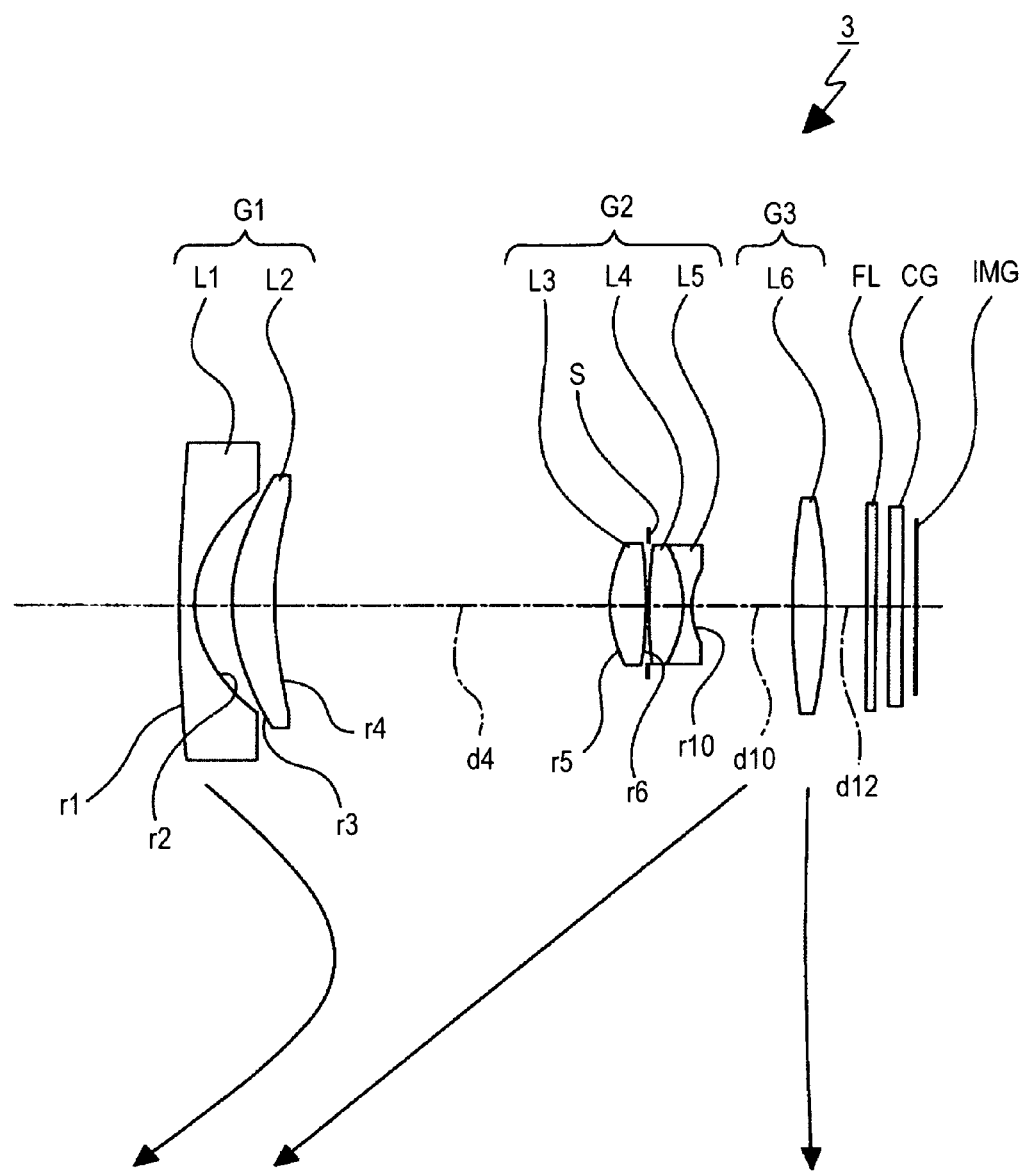
FIG. 10 is an illustration showing a configuration of a zoom lens according to a third embodiment of the invention.

FIG. 10 is an illustration showing a configuration of a zoom lens 3 according to a third embodiment of the invention.

As shown in FIG. 10, the zoom lens 3 of the third embodiment includes six lenses.

The zoom lens 3 includes a first lens group G1 having negative refracting power, a second lens group G2 having positive refracting power, and a third lens group G3 having positive refracting power which are disposed in the order from the object side to the image side.

The first lens group G1 includes a first lens L1 and a second lens L2 disposed in the order from the object side to the image side. The first lens L1 is a negative meniscus lens which is aspherically shaped on both sides thereof and which includes a convex surface facing the object. The second lens L2 is a positive meniscus lens which is aspherically shaped on both sides thereof and which includes a convex surface facing the object.

The second lens group G2 includes a third lens L3 and a cemented lens which are disposed in the order from the object side to the image side. The third lens L3 is a double convex lens which is aspherically shaped on both sides thereof. The cemented lens is formed by bonding a fourth lens L4 which is a double convex lens and a fifth lens L5 which is a double concave lens which is aspherically shaped on a surface facing the image.

The third lens group G3 is constituted by a sixth lens L6 which is a double convex lens.

A stop S (a stop surface r7) is disposed between the third lens L3 and the fourth lens L4 of the second lens group G2.

Between the third lens group G3 and an image plane IMG, a filter FL and a cover glass CG are disposed in the order from the object side to the image side.

Table 9 shows lens data which is Example 3 of specific numerical values used in the zoom lens 3 according to the third embodiment of the invention.

TABLE 9

| si | ri | ASP | di | ni | Ni |
|---|---|---|---|---|---|
| 1 | 50.054 | ASP | 0.800 | 1.85135 | 40.10 |
| 2 | 5.024 | ASP | 1.694 | | |
| 3 | 8.3652 | ASP | 1.906 | 2.00178 | 19.30 |
| 4 | 14.8327 | ASP | variable | | |
| 5 | 5.000 | ASP | 1.669 | 1.62263 | 58.16 |
| 6 | −33.550 | ASP | 0.100 | | |
| 7 (S) | INF | | 0.000 | | |
| 8 | 14.486 | | 1.631 | 1.83481 | 42.72 |
| 9 | −5.082 | | 0.400 | 1.68893 | 31.16 |
| 10 | 4.299 | ASP | variable | | |
| 11 | 23.268 | | 1.650 | 1.76802 | 49.24 |
| 12 | −28.8603 | | variable | | |
| 13 | INF | | 0.300 | 1.51680 | 64.20 |
| 14 | INF | | 0.720 | | |
| 15 | INF | | 0.500 | 1.56883 | 56.04 |
| 16 | INF | | 0.600 | | |
| 17 (IMG) | INF | | 0.000 | | |

In the zoom lens 3, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r5) of the third lens L3 of the second lens group G2, an image-facing surface (r6) of the third lens L3 of the second lens group G2, and an image-facing surface (r10) of the fifth lens L5 of the second lens group G2 are aspherically shaped. Table 10 shows fourth-order aspheric coefficients A4, sixth-order aspheric coefficients A6, eighth-order aspheric coefficients A8, and tenth-order aspheric coefficients A10 of the aspheric surfaces associated with Example 3 of numerical values along with conic constants K.

TABLE 10

| si | K | A4 | A6 | A8 | A10 |
|---|---|---|---|---|---|
| 1 | 1.7584E+00 | −6.0635E−05 | 6.2461E−06 | −1.6799E−07 | 1.1851E−09 |
| 2 | −6.0905E−01 | −6.2646E−04 | 6.1550E−05 | −1.3463E−06 | 2.5444E−09 |
| 3 | 5.4261E−01 | −1.1723E−03 | 5.0401E−05 | −1.6284E−06 | 2.1009E−08 |
| 4 | −7.2854E+00 | −6.4089E−04 | 3.9042E−05 | −1.4072E−06 | 2.1210E−08 |
| 5 | 5.1964E−01 | −1.7492E−03 | −1.2615E−04 | −1.3862E−06 | −1.2258E−06 |
| 6 | 4.3818E+01 | −8.9783E−04 | −1.0566E−06 | −6.6201E−06 | −4.4260E−07 |
| 10 | 8.8173E−01 | 1.7989E−03 | −3.0656E−05 | 0.0000E+00 | 0.0000E+00 |

During zooming of the zoom lens 3 between the wide angle end and the telephoto end, changes occur in a surface distance d4 between the first lens group G1 and the second lens group G2, a surface distance d10 between the second lens group G2 and the third lens group G3, and a surface distance d12 between the third lens group G3 and the filter FL. Table 11 shows the amounts of changes in each surface distance that can occur when the lens having the numerical values of Example 3 is set at the wide angle end (at a focal length f of 4.38), when the lens is set at an intermediate focal length (at a focal length f of 9.49), and when the lens is set at the telephoto end (at a focal length f of 20.61). The amounts of changes are shown along with F-numbers Fno and half-angles of view ω.

TABLE 11

| | f | | |
|---|---|---|---|
| | 4.38 | 9.49 | 20.61 |
| Fno | 2.48 | 3.80 | 6.42 |
| ω | 42.87 | 22.39 | 10.60 |
| d4 | 14.425 | 5.477 | 0.700 |
| d10 | 3.758 | 10.376 | 21.871 |
| d12 | 2.384 | 1.500 | 1.600 |

In the zoom lens 3, focal lengths of the first lens group G1, the second lens group G2 and the third lens group G3 are shown in Table 12.

TABLE 12

| | focal length |
|---|---|
| first lens group | −11.620 |
| second lens group | 9.298 |
| third lens group | 16.926 |

Figure 11:
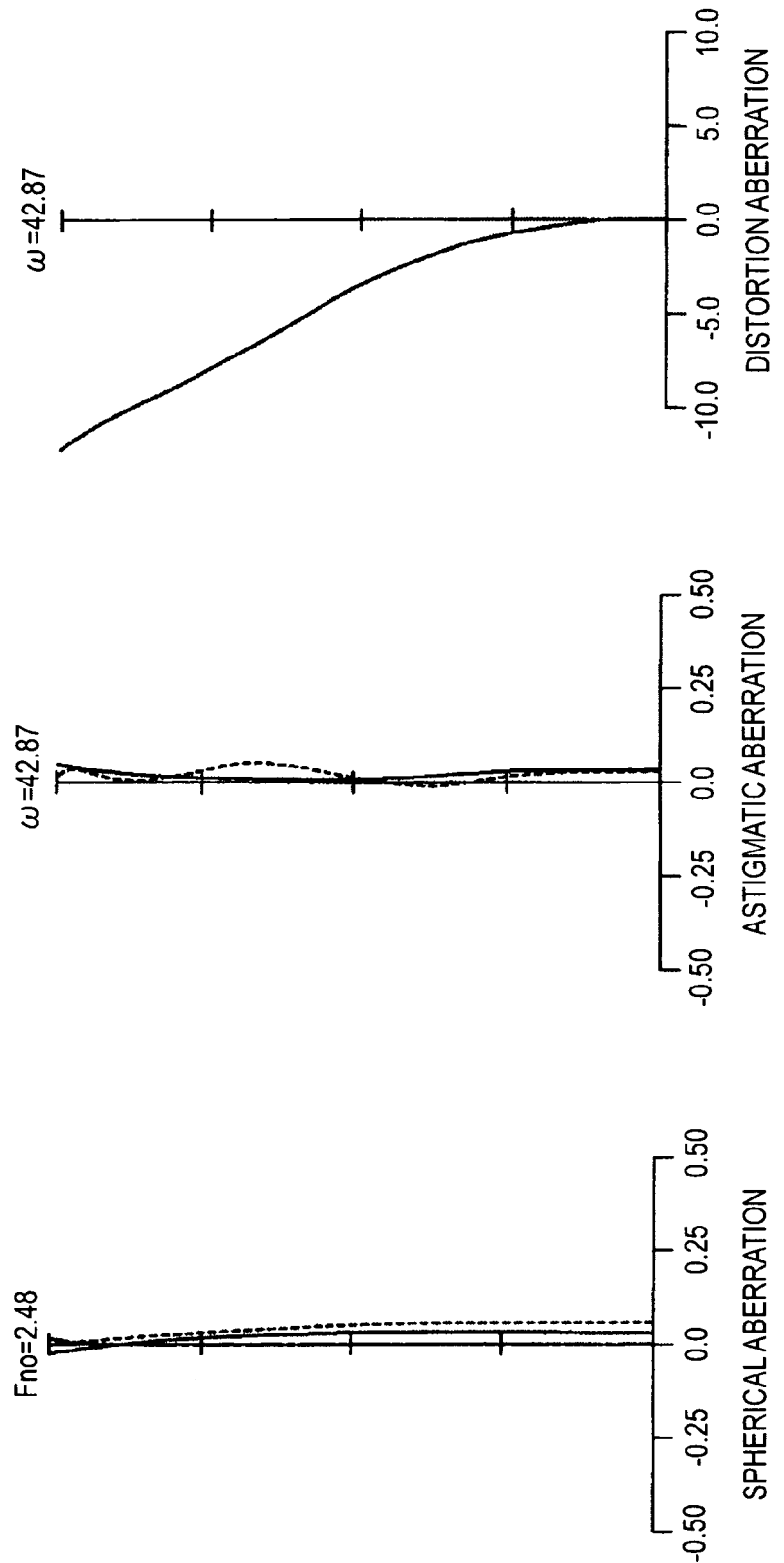
FIG. 11 shows aberration diagrams obtained using an example of specific numerical values applied to the third embodiment with FIG. 12 and FIG. 13.
Figure 12:
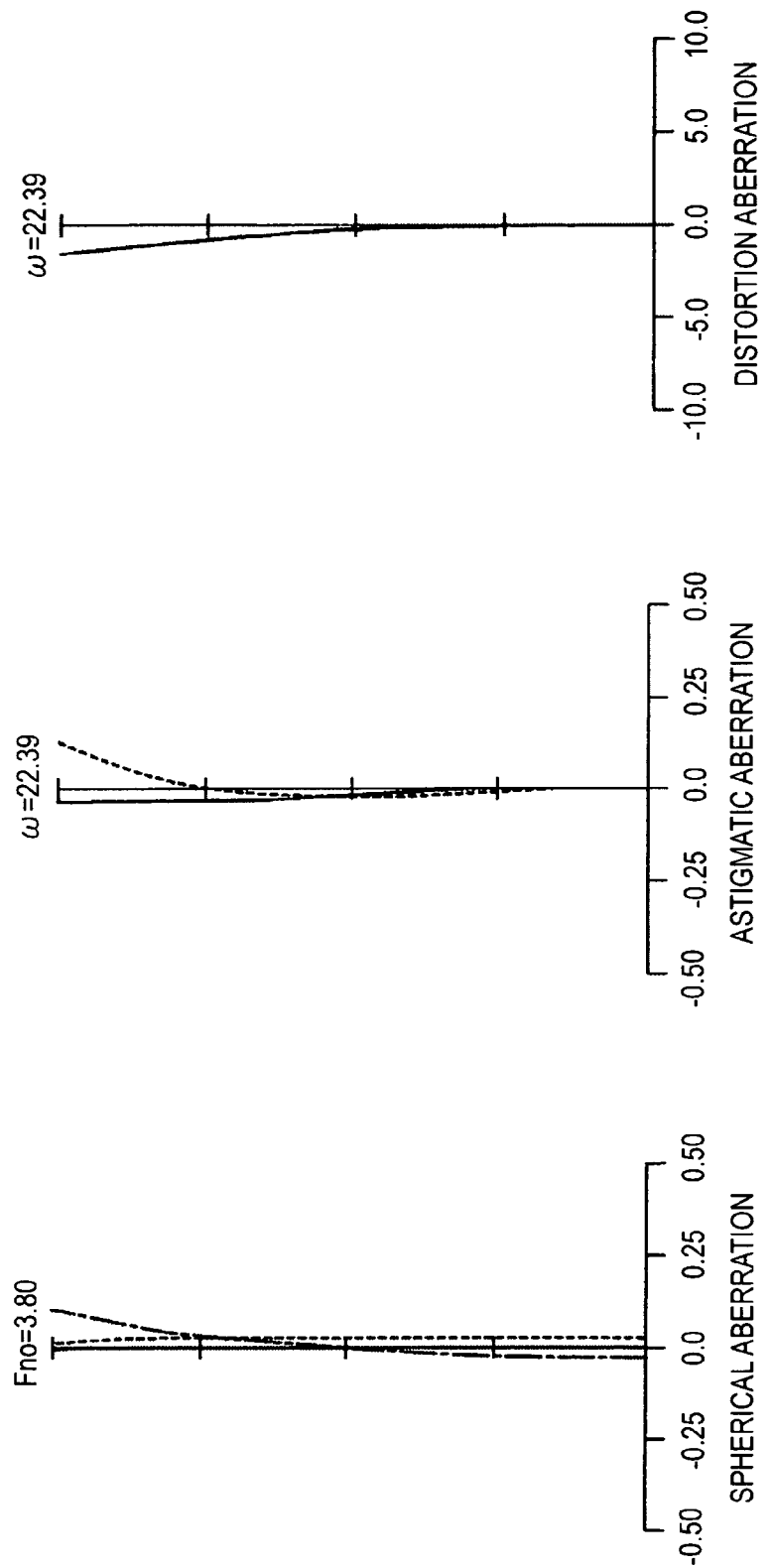
FIG. 12 shows a spherical aberration, an astigmatic aberration, and a distortion aberration observed when the lens is set at an intermediate focal length.
Figure 13:
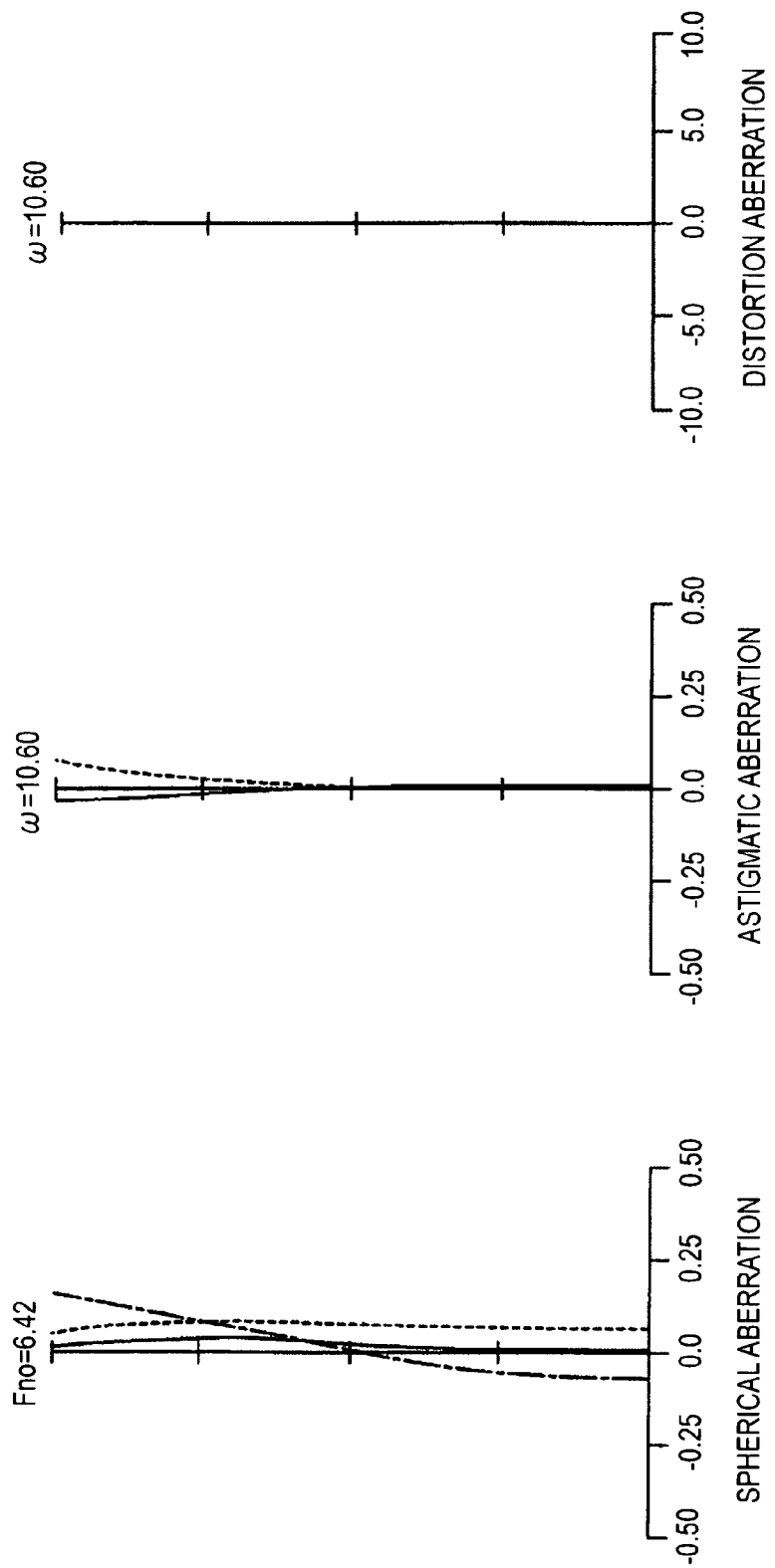
FIG. 13 shows a spherical aberration, an astigmatic aberration, and a distortion aberration observed when the lens is set at a telephoto end.

FIGS. 11 to 13 show various aberrations encountered when the lens having the numerical values of Example 3 is focused at infinity. FIG. 11 shows aberrations encountered when the lens is set at the wide angle end (at the focal length f of 4.38). FIG. 12 shows aberrations encountered when the lens is set at the intermediate focal length (at the focal length f of 9.49). FIG. 13 shows aberrations encountered when the lens is set at the telephoto end (at the focal length f of 20.61).

In the spherical aberration diagrams shown in FIGS. 11 to 13, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 11 to 13, solid lines represent values measured on a sagittal plane, and broken lines represent values measured on a meridional plane.

It is obvious from the aberration diagrams that aberrations can be satisfactorily corrected to achieve high imaging performance by the numerical values of Example 3.

Figure 14:
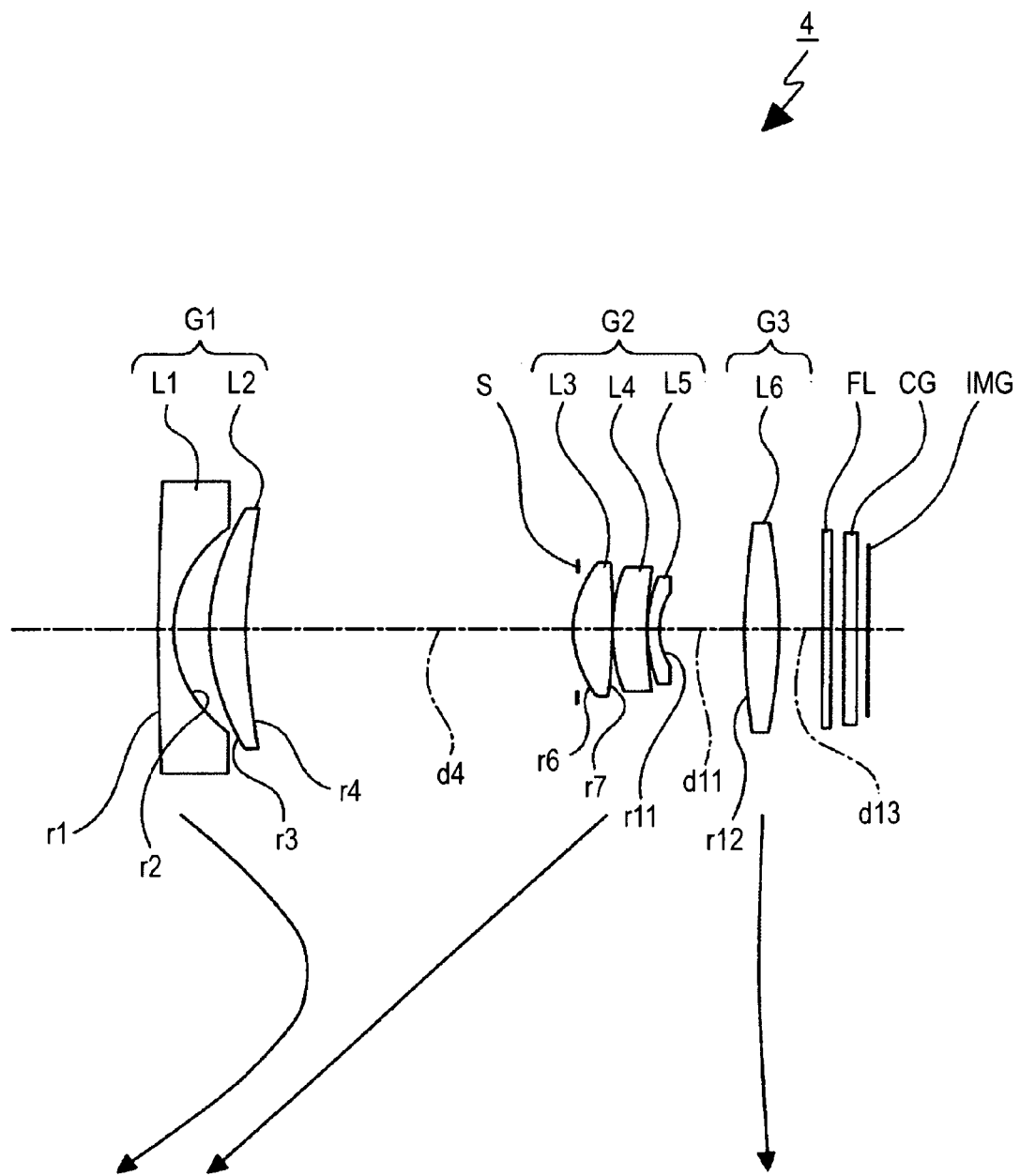
FIG. 14 is an illustration showing a configuration of a zoom lens according to a fourth embodiment of the invention.

FIG. 14 is an illustration showing a configuration of a zoom lens 4 according to a fourth embodiment of the invention.

As shown in FIG. 14, the zoom lens 4 of the fourth embodiment includes six lenses.

The zoom lens 4 includes a first lens group G1 having negative refracting power, a second lens group G2 having positive refracting power, and a third lens group G3 having positive refracting power which are disposed in the order from the object side to the image side.

The first lens group G1 includes a first lens L1 and a second lens L2 disposed in the order from the object side to the image side. The first lens L1 is a negative meniscus lens which is aspherically shaped on both sides thereof and which includes a convex surface facing the object. The second lens L2 is a positive meniscus lens which is aspherically shaped on both sides thereof and which includes a convex surface facing the object.

The second lens G2 includes a third lens L3 which is is a double convex lens aspherically shaped on both sides, a fourth lens L4 which includes a convex surface facing the object, and a fifth lens L5 which is aspherically shaped on a side thereof facing the image and which includes a concave surface facing the image are disposed in the order from the object side to the image side.

The third lens group G3 is constituted by a sixth lens L6 which is a double convex lens aspherically shaped on a surface thereof facing the object.

A stop S (a stop surface r5) is disposed between the first lens group G1 and the second lens group G2.

Between the third lens group G3 and an image plane IMG, a filter FL and a cover glass CG are disposed in the order from the object side to the image side.

Table 13 shows lens data which is Example 4 of specific numerical values used in the zoom lens 4 according to the fourth embodiment of the invention.

TABLE 13

| si | ri | ASP | di | ni | vi |
|---|---|---|---|---|---|
| 1 | 42.035 | ASP | 0.800 | 1.85135 | 40.10 |
| 2 | 5.017 | ASP | 1.706 | | |
| 3 | 8.1534 | ASP | 1.694 | 2.00178 | 19.30 |
| 4 | 13.7212 | ASP | variable | | |
| 5 (S) | INF | | 0.000 | | |
| 6 | 4.994 | ASP | 1.700 | 1.59201 | 67.02 |

TABLE 13-continued

| si | ri | ASP | di | ni | vi |
|---|---|---|---|---|---|
| 7 | −100.00 | ASP | 0.100 | | |
| 8 | 8.346 | | 1.673 | 1.72916 | 54.67 |
| 9 | 28.702 | | 0.100 | | |
| 10 | 10.383 | | 0.427 | 1.82114 | 24.06 |
| 11 | 3.852 | ASP | variable | | |
| 12 | 26.730 | ASP | 1.650 | 1.76802 | 49.24 |
| 13 | −21.305 | | variable | | |
| 14 | INF | | 0.300 | 1.51680 | 64.20 |
| 15 | INF | | 0.720 | | |
| 16 | INF | | 0.500 | 1.56883 | 56.04 |
| 17 | INF | | 0.600 | | |
| 18 (IMG) | INF | | 0.000 | | |

In the zoom lens 4, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r6) of the third lens L3 of the second lens group G2, an image-facing surface (r7) of the third lens L3 of the second lens group G2, an image-facing surface (r11) of the fifth lens 5 of the second lens group G2, and an object-facing surface (r12) of the sixth lens L6 of the third lens group G3 are aspherically shaped. Table 14 shows fourth-order aspheric coefficients A4, sixth-order aspheric coefficients A6, eighth-order aspheric coefficients A8, and tenth-order aspheric coefficients A10 of the aspheric surfaces associated with Example 4 of numerical values along with conic constants K.

TABLE 14

| si | K | A4 | A6 | A8 | A10 |
|---|---|---|---|---|---|
| 1 | 1.1295E+01 | −9.8787E−05 | 3.3542E−06 | −1.5746E−07 | 1.4098E−09 |
| 2 | −3.4513E−01 | −1.1329E−03 | 5.9182E−05 | −1.6953E−06 | −5.9497E−09 |
| 3 | −1.7920E−01 | −1.4052E−03 | 5.9576E−05 | −1.7207E−06 | 2.0002E−08 |
| 4 | −9.8487E+00 | −7.6071E−04 | 3.9461E−05 | −1.5936E−06 | 2.5662E−08 |
| 6 | −5.0232E−01 | −2.4883E−04 | −1.9188E−05 | 0.0000E+00 | 0.0000E+00 |
| 7 | −1.2929E+02 | −3.7051E−04 | 5.2448E−06 | 0.0000E+00 | 0.0000E+00 |
| 11 | 3.5885E−01 | 1.0322E−03 | 2.2883E−05 | 0.0000E+00 | 0.0000E+00 |
| 12 | 0.0000E+00 | −3.8673E−04 | 2.9998E−05 | −1.2342E−06 | 1.9346E−08 |

During zooming of the zoom lens 4 between the wide angle end and the telephoto end, changes occur in a surface distance d4 between the first lens group G1 and the stop S, a surface distance d11 between the second lens group G2 and the third lens group G3, and a surface distance d13 between the third lens group G3 and the filter FL. Table 15 shows the amounts of changes in each surface distance that can occur when the lens having the numerical values of Example 4 is set at the wide angle end (at a focal length f of 4.38), when the lens is set at an intermediate focal length (at a focal length f of 9.49), and when the lens is set at the telephoto end (at a focal length f of 20.61). The amounts of changes are shown along with F-numbers Fno and half-angles of view ω.

TABLE 15

| | f | | |
|---|---|---|---|
| | 4.38 | 9.49 | 20.61 |
| Fno | 2.15 | 3.25 | 5.52 |
| ω | 43.04 | 21.95 | 10.43 |
| d4 | 15.598 | 6.224 | 1.443 |
| d11 | 3.982 | 10.190 | 21.954 |
| d13 | 2.025 | 1.500 | 1.600 |

In the zoom lens 4, focal lengths of the first lens group G1, the second lens group G2 and the third lens group G3 are shown in Table 16.

TABLE 16

|  | focal length |
| --- | --- |
| first lens group | −11.679 |
| second lens group | 9.393 |
| third lens group | 15.596 |

Figure 15:
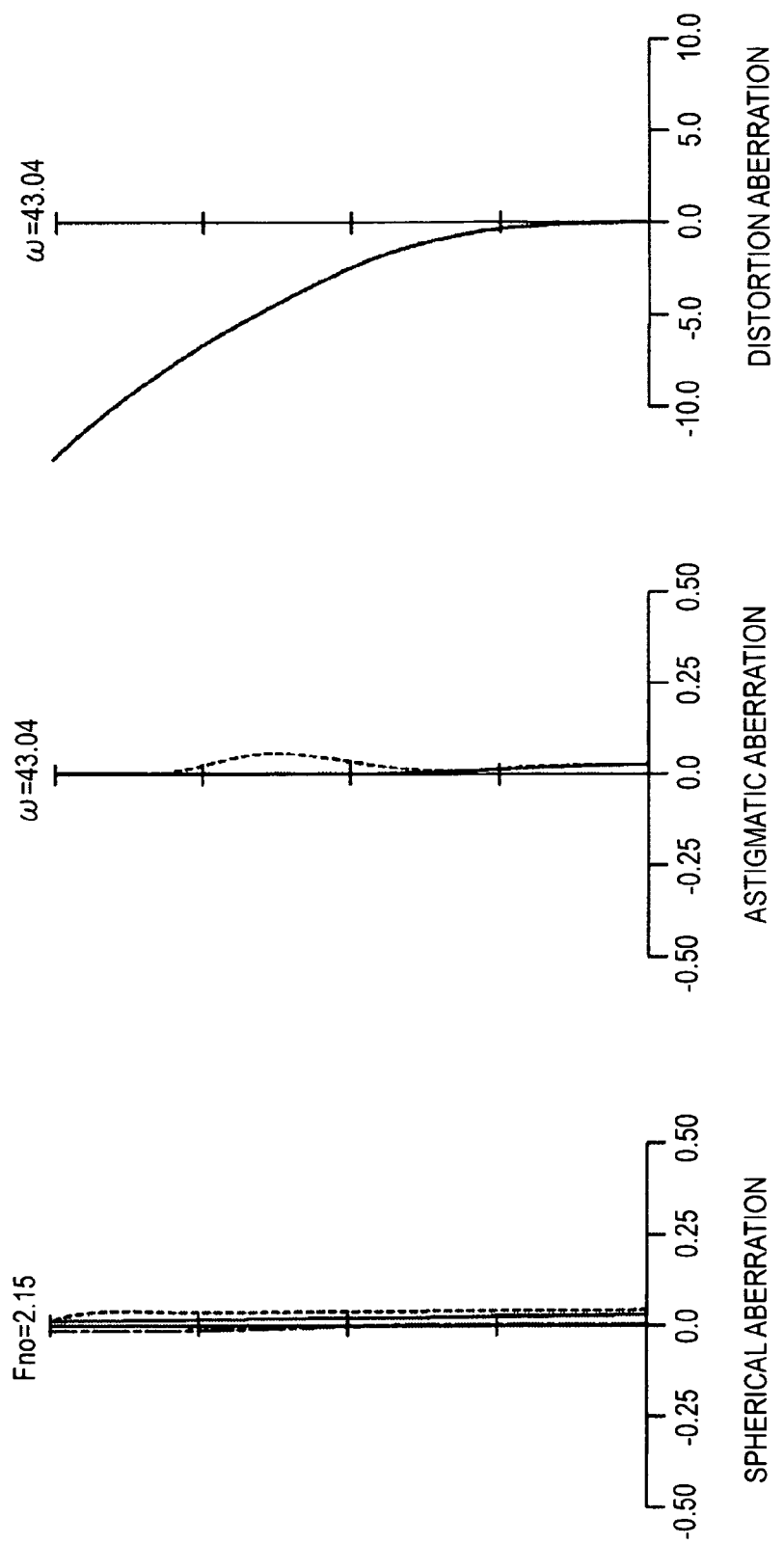
FIG. 15 shows aberration diagrams obtained using an example of specific numerical values applied to the fourth embodiment with FIG. 16 and FIG. 17.
Figure 16:
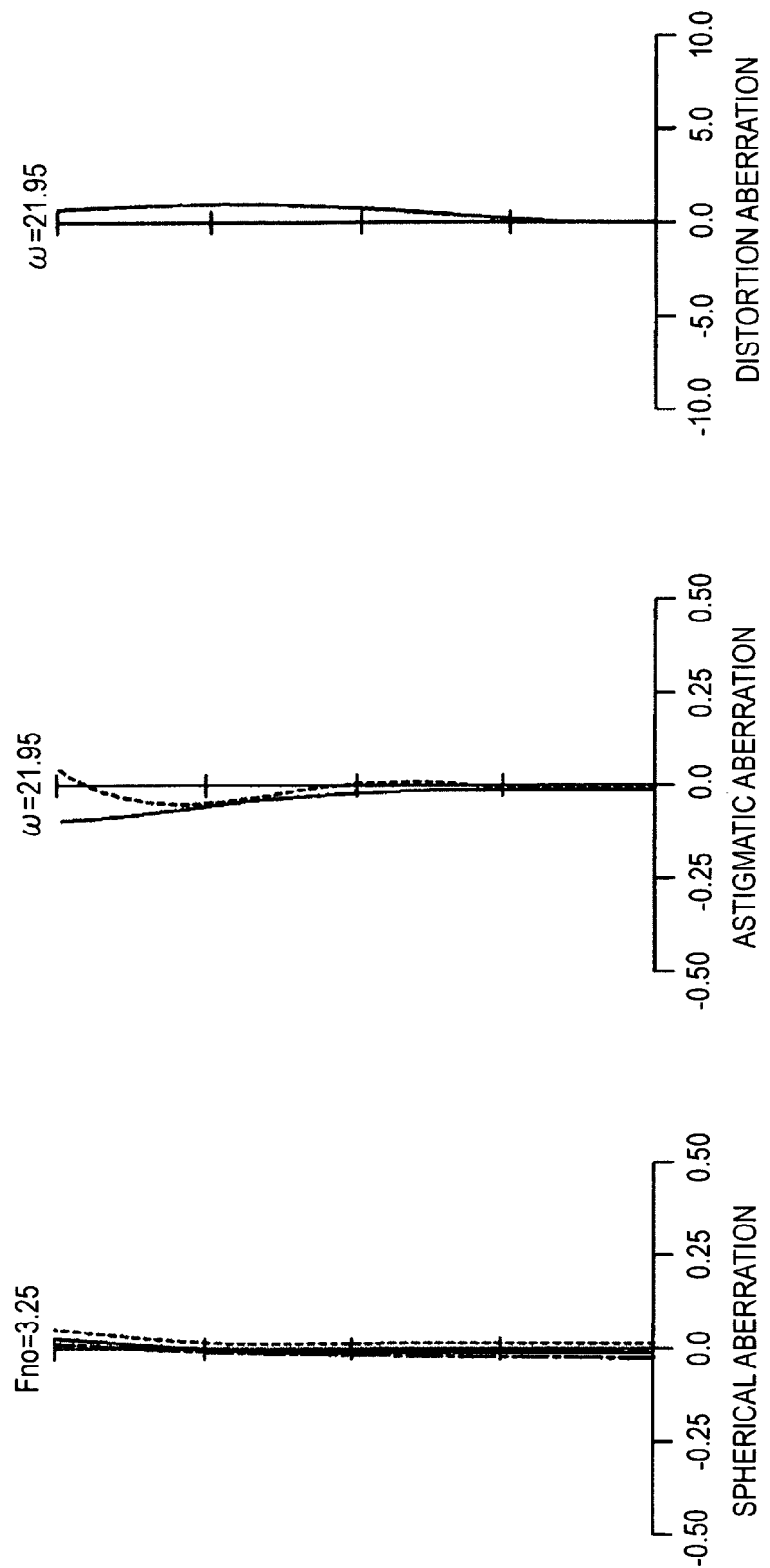
FIG. 16 shows a spherical aberration, an astigmatic aberration, and a distortion aberration observed when the lens is set at an intermediate focal length.
Figure 17:
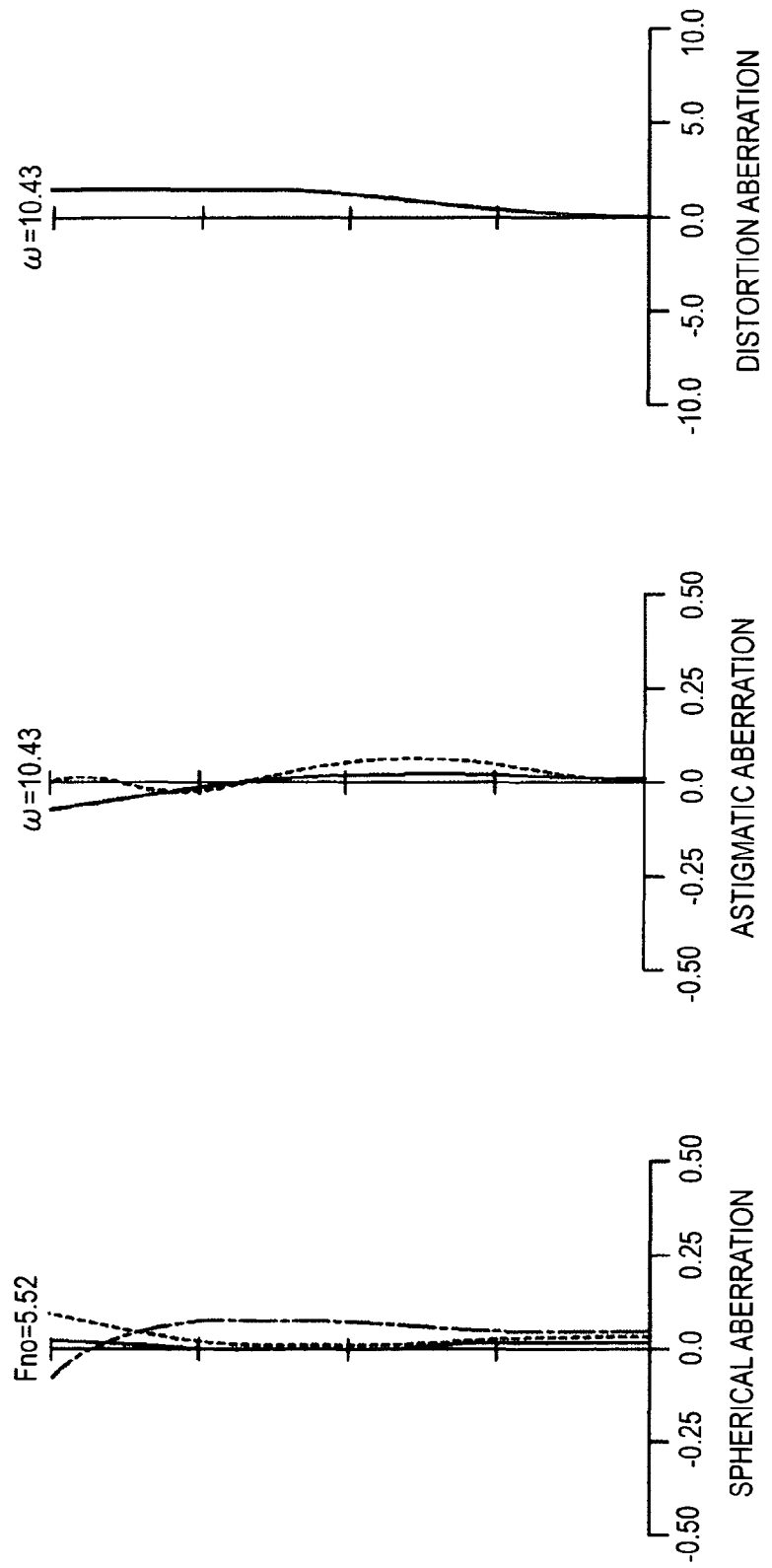
FIG. 17 shows a spherical aberration, an astigmatic aberration, and a distortion aberration observed when the lens is set at a telephoto end.

FIGS. 15 to 17 show various aberrations encountered when the lens having the numerical values of example 4 is focused at infinity. FIG. 15 shows aberrations encountered when the lens is set at the wide angle end (at the focal length f of 4.38). FIG. 16 shows aberrations encountered when the lens is set at the intermediate focal length (at the focal length f of 9.49). FIG. 17 shows aberrations encountered when the lens is set at the telephoto end (at the focal length f of 20.61).

In the spherical aberration diagrams shown in FIGS. 15 to 17, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 15 to 17, solid lines represent values measured on a sagittal plane, and broken lines represent values measured on a meridional plane.

It is obvious from the aberration diagrams that aberrations can be satisfactorily corrected to achieve high imaging performance by the numerical values of Example 4.

Figure 18:
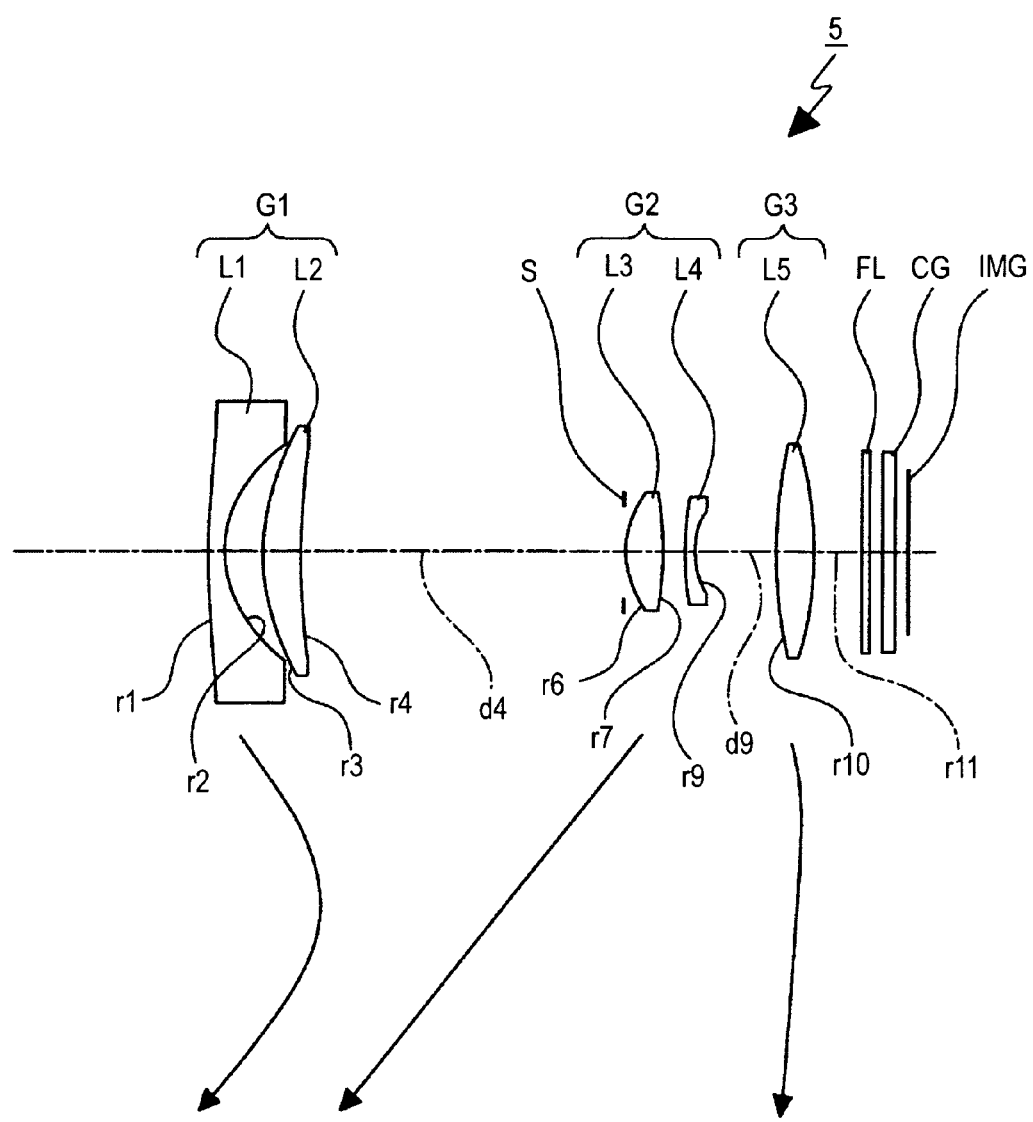
FIG. 18 is an illustration showing a configuration of a zoom lens according to a fifth embodiment of the invention.

FIG. 18 is an illustration showing a configuration of a zoom lens 5 according to a fifth embodiment of the invention.

As shown in FIG. 18, the zoom lens 5 of the fifth embodiment includes five lenses.

The zoom lens 5 includes a first lens group G1 having negative refracting power, a second lens group G2 having positive refracting power, and a third lens group G3 having positive refracting power which are disposed in the order from the object side to the image side.

The first lens group G1 includes a first lens L1 and a second lens L2 disposed in the order from the object side to the image side. The first lens L1 is a negative meniscus lens which is aspherically shaped on both sides thereof and which includes a convex surface facing the object. The second lens L2 is a positive meniscus lens which is aspherically shaped on both sides thereof and which includes a convex surface facing the object.

The second lens group G2 includes a third lens L3 and a fourth lens L4 disposed in the order from the object side to the image side. The third lens L3 is a double convex lens which is aspherically shaped on both sides. The forth lens L4 which is aspherically shaped on a side thereof facing the image and which includes a concave surface facing the image.

The third lens group G3 is constituted by a fifth lens L5 which is a double convex lens aspherically shaped on a side thereof facing the object.

A stop S (a stop surface r5) is disposed between the first lens group G1 and the second lens group G2.

Between the third lens group G3 and an image plane IMG, a filter FL and a cover glass CG are disposed in the order from the object side to the image side.

Table 17 shows lens data which is Example 5 of specific numerical values used in the zoom lens 5 according to the fifth embodiment of the invention.

TABLE 17

| si | ri | ASP | di | ni | vi |
| --- | --- | --- | --- | --- | --- |
| 1 | 36.540 | ASP | 0.800 | 1.85135 | 40.10 |
| 2 | 5.103 | ASP | 1.746 |  |  |
| 3 | 9.2790 | ASP | 1.654 | 2.00178 | 19.30 |
| 4 | 16.7998 | ASP | variable |  |  |
| 5 (S) | INF |  | 0.000 |  |  |
| 6 | 4.0740 | ASP | 1.700 | 1.59201 | 67.02 |
| 7 | −17.247 | ASP | 0.987 |  |  |
| 8 | 9.735 |  | 0.407 | 1.82114 | 24.06 |
| 9 | 4.025 | ASP | variable |  |  |
| 10 | 21.957 | ASP | 1.650 | 1.76802 | 49.24 |
| 11 | −22.241 |  | variable |  |  |
| 12 | INF |  | 0.300 | 1.51680 | 64.20 |
| 13 | INF |  | 0.720 |  |  |
| 14 | INF |  | 0.500 | 1.56883 | 56.04 |
| 15 | INF |  | 0.600 |  |  |
| 16 (IMG) | INF |  | 0.000 |  |  |

In the zoom lens 5, an object-facing surface (r1) of the first lens L1 of the first lens group G1, an image-facing surface (r2) of the first lens L1 of the first lens group G1, an object-facing surface (r3) of the second lens L2 of the first lens group G1, an image-facing surface (r4) of the second lens L2 of the first lens group G1, an object-facing surface (r6) of the third lens L3 of the second lens group G2, an image-facing surface (r7) of the third lens L3 of the second lens group G2, an image-facing surface (r9) of the fourth lens L4 of the second lens group G2, and an object-facing surface (r10) of the fifth lens L5 of the third lens group G3 are aspherically shaped. Table 18 shows fourth-order aspheric coefficients A4, sixth-order aspheric coefficients A6, eighth-order aspheric coefficients A8, and tenth-order aspheric coefficients A10 of the aspheric surfaces associated with Example 5 of numerical values along with conic constants K.

TABLE 18

| si | K | A4 | A6 | A8 | A10 |
| --- | --- | --- | --- | --- | --- |
| 1 | 1.0240E+01 | −4.9200E−05 | 2.1891E−06 | −1.6397E−07 | 1.6125E−09 |
| 2 | −3.0385E−01 | −9.6400E−04 | 5.8364E−05 | −1.8936E−06 | −4.4796E−09 |
| 3 | 1.2540E−02 | −1.3033E−03 | 5.8469E−05 | −1.7293E−06 | 2.1331E−08 |
| 4 | −1.7061E+01 | −7.5263E−04 | 3.9884E−05 | −1.6551E−06 | 2.8336E−08 |
| 6 | −4.3956E−01 | −8.5258E−05 | −6.4319E−06 | 0.0000E+00 | 0.0000E+00 |
| 7 | −3.4326E+01 | 3.7531E−05 | −1.2747E−06 | 0.0000E+00 | 0.0000E+00 |
| 9 | 9.1029E−01 | −1.6236E−04 | 4.7102E−05 | 0.0000E+00 | 0.0000E+00 |
| 10 | 0.0000E+00 | −4.5220E−04 | 3.1656E−05 | −1.3471E−06 | 2.2038E−08 |

During zooming of the zoom lens 5 between the wide angle end and the telephoto end, changes occur in a surface distance d4 between the first lens group G1 and the stop S, a surface distance d9 between the second lens group G2 and the third lens group G3, and a surface distance d11 between the third lens group G3 and the filter FL. Table 19 shows the amounts of changes in each surface distance that can occur when the lens having the numerical values of Example 5 is set at the wide angle end (at a focal length f of 4.37), when the lens is set at an intermediate focal length (at a focal length f of 8.75), and when the lens is set at the telephoto end (at a focal length f of 17.50). The amounts of changes are shown along with F-numbers Fno and half-angles of view ω.

TABLE 19

|     | f |   |   |
| --- | --- | --- | --- |
|     | 4.37 | 8.75 | 17.50 |
| Fno | 2.42 | 3.49 | 5.46 |
| ω   | 41.60 | 23.42 | 12.02 |
| d4  | 15.012 | 6.362 | 1.500 |
| d9  | 3.829 | 9.399 | 18.991 |
| d11 | 2.254 | 1.769 | 1.945 |

In the zoom lens 5, focal lengths of the first lens group G1, the second lens group G2 and the third lens group G3 are shown in Table 20.

TABLE 20

|     | focal length |
| --- | --- |
| first lens group | −12.130 |
| second lens group | 9.581 |
| third lens group | 14.554 |

Figure 19:
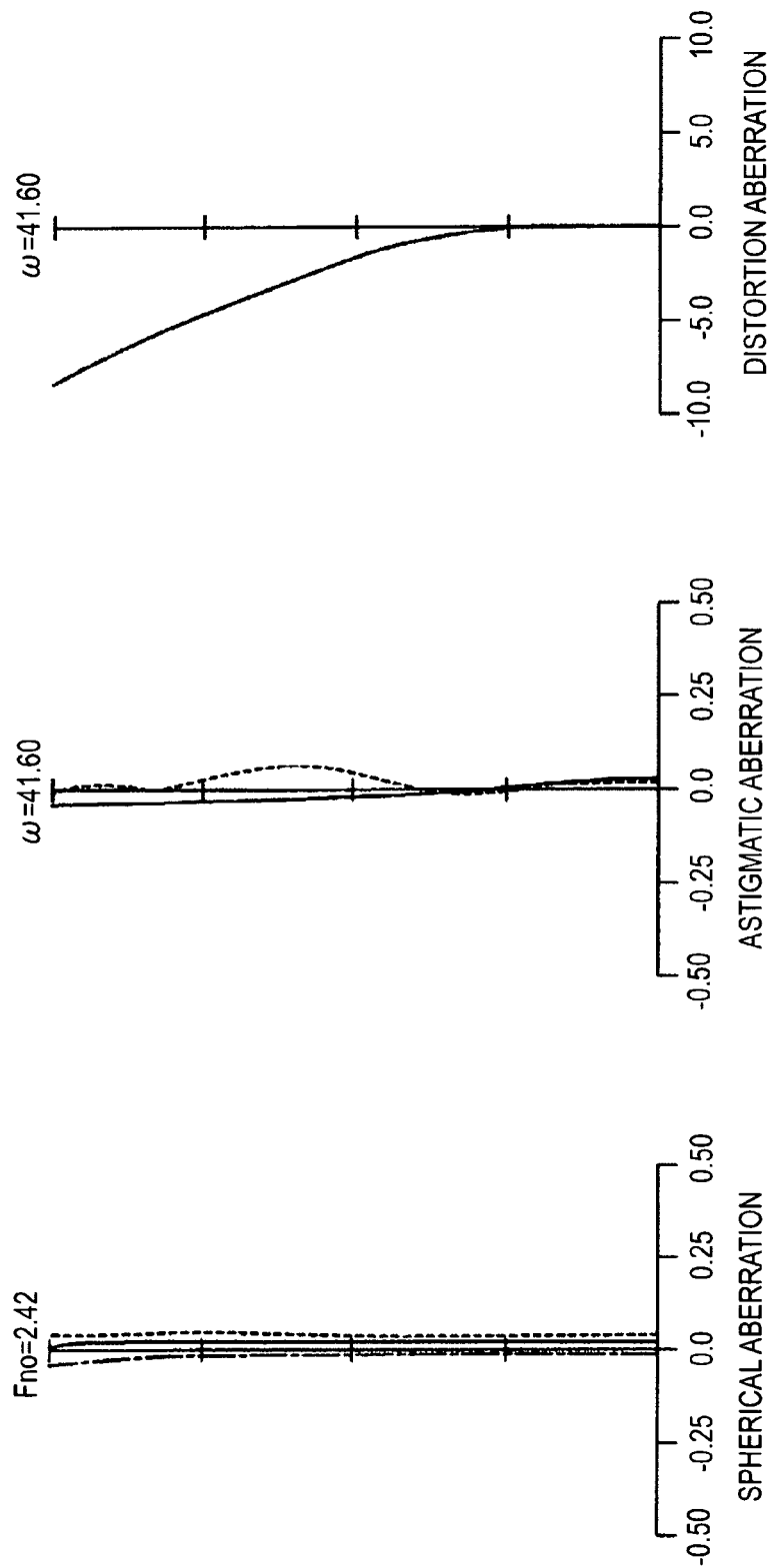
FIG. 19 shows aberration diagrams obtained using an example of specific numerical values applied to the fifth embodiment with FIG. 20 and FIG. 21.
Figure 20:
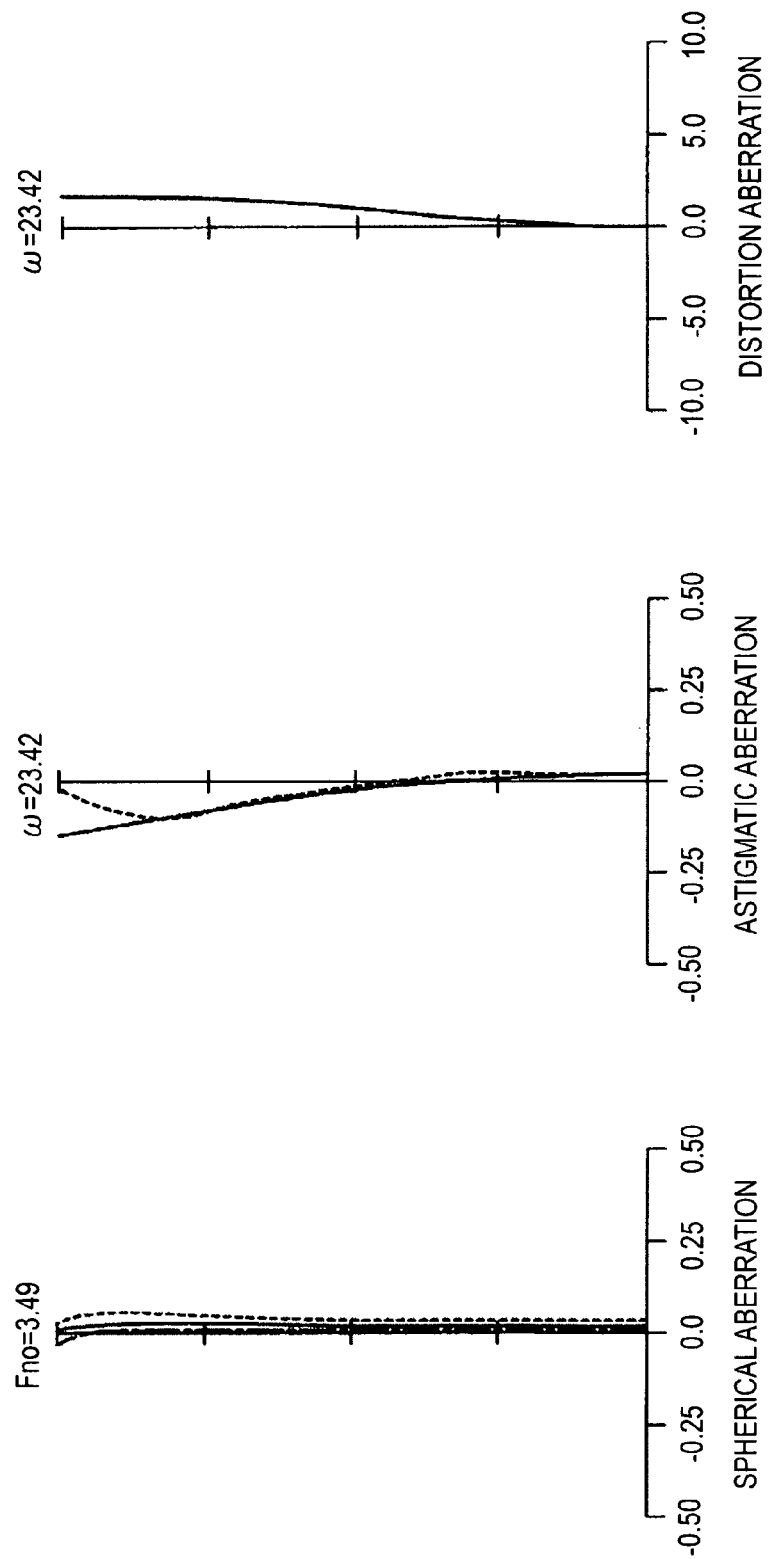
FIG. 20 shows a spherical aberration, an astigmatic aberration, and a distortion aberration observed when the lens is set at an intermediate focal length.

FIGS. 19 to 21 show various aberrations encountered when the lens having numerical values of Example 5 is focused at infinity. FIG. 19 shows aberrations encountered when the lens is set at the wide angle end (at the focal length f of 4.37). FIG. 20 shows aberrations encountered when the lens is set at the intermediate focal length (at the focal length f of 8.75). FIG. 21 shows aberrations encountered when the lens is set at the telephoto end (at the focal length f of 17.50).

In the spherical aberration diagrams shown in FIGS. 19 to 21, solid lines represent values measured using a d-ray (having a wavelength of 587.6 nm); dotted lines represent values measured using a c-ray (having a wavelength of 656.3 nm); and chain lines represent values measured using a g-ray (having a wavelength of 435.8 nm). In the astigmatic aberration diagrams shown in FIGS. 19 to 21, solid lines represent values measured on a sagittal plane, and broken lines represent values measured on a meridional plane.

It is obvious from the aberration diagrams that aberrations can be satisfactorily corrected to achieve high imaging performance by the numerical values of Example 5.

Table 21 shows values of the zoom lenses 1 to 5 to be applied to Conditional Expressions (1) to (10), i.e., values to be substituted for "R2f", "R2r", and "R2f/R2r" in Conditional Expression (1), "Sga", "Sgs", and |Sga/Sgs| in Conditional Expression (2), "f2", "fw", and "|f2/fw|" in Conditional Expression (3), "f1", "fw", and "|f1/fw|" in Conditional Expression (4), "D2", "fw", and "D2/fw" in Conditional Expression (5), "n11" in Conditional Expression (6), "n12" in Conditional Expression (7), "v12" in Conditional Expression (8), "vd22", "vd23", and "vd22-vd23" in Conditional Expressions (9) and (10).

TABLE 21

|   |   | zoom lens 1 | zoom lens 2 | zoom lens 3 | zoom lens 4 | zoom lens 5 |
| --- | --- | --- | --- | --- | --- | --- |
|   | R2f | 4.929 | 6.066 | 5.000 | 4.994 | 4.074 |
|   | R2r | 4.413 | 4.322 | 4.299 | 3.852 | 4.025 |
| Conditional Expression (1) | R2f/R2r | 1.117 | 1.404 | 1.163 | 1.297 | 1.102 |
|   | Sga | 0.42 | 0.50 | 0.43 | 0.56 | 0.54 |
|   | Sgs | 0.38 | 0.49 | 0.40 | 0.53 | 0.50 |
| Conditional Expression (2) | |Sga/Sgs| | 1.09 | 1.02 | 1.09 | 1.06 | 1.08 |
|   | fw | 4.37 | 5.10 | 4.38 | 4.38 | 4.37 |
|   | f2 | 9.32 | 10.57 | 9.30 | 9.39 | 9.58 |
| Conditional Expression (3) | |f2/fw| | 2.13 | 2.07 | 2.13 | 2.15 | 2.19 |
|   | f1 | −11.76 | −14.10 | −11.62 | −11.68 | −12.13 |
| Conditional Expression (4) | |f1/fw| | 2.69 | 2.77 | 2.66 | 2.67 | 2.77 |
|   | D2 | 3.80 | 3.61 | 3.80 | 4.00 | 3.09 |
| Conditional Expression (5) | D2/fw | 0.87 | 0.71 | 0.87 | 0.91 | 0.71 |
| Conditional Expression (6) | n11 | 1.85135 | 1.83441 | 1.85135 | 1.85135 | 1.85135 |
| Conditional Expression (7) | n12 | 2.00178 | 2.00178 | 2.00178 | 2.00178 | 2.00178 |
| Conditional Expression (8) | v12 | 19.30 | 19.30 | 19.30 | 19.30 | 19.30 |
|   | vd22 | 42.72 | 42.34 | 42.72 | 54.67 | — |
|   | vd23 | 31.16 | 31.16 | 31.16 | 24.06 | — |
| Conditional Expression (9) | vd22-vd23 | — | — | — | 30.61 | — |
| Conditional Expression (10) | vd22-vd23 | 11.56 | 11.18 | 11.56 | — | — |

As will be apparent from Table 21, the zoom lenses 1 to 5 satisfy Conditional Expressions (1) to (8), the zoom lenses 1 to 3 satisfy Conditional Expression (10), and the zoom lens 4 satisfies Conditional Expression (9).

An imaging apparatus according to one embodiment of the invention will now be described.

The imaging apparatus according to this embodiment of the invention is an imaging apparatus which includes a zoom lens and an imaging device converting an optical image formed by the zoom lens into an electrical signal.

The zoom lens provided in the imaging apparatus according to the embodiment of the invention includes a first lens group having negative refracting power, a second lens group having positive refracting power, and a third lens group having positive refracting power which are disposed in the order from an object side to an image side.

During zooming of the zoom lens provided in the imaging apparatus from the wide angle end to the telephoto end, the first lens group of the zoom lens is moved in a direction and the second lens group is moved together with a stop toward the object such that an air space between the first lens group and the second lens group decreases and such that an air space between the second lens group and the third lens group increases.

In the zoom lens provided in the imaging apparatus, the stop is formed so as to move together with the second lens group, thereby cutting or simplifying a driving mechanism for changing an aperture diameter of the stop, which allows the entire optical length to be reduced. In particular, in the case that the zoom lens is applied to a collapsible-barrel type imaging apparatus in which a lens barrel is collapsed and expanded, the entire length in the collapsed state can be reduced.

In the zoom lens provided in the imaging apparatus according to the embodiment of the invention, the second lens group is formed by a positive lens aspherically shaped on at least a side thereof facing the object and having a convex surface facing the object and a negative lens positioned on the image side of the positive lens, aspherically shaped on at least a side thereof facing the image and having a concave surface facing the image.

The second lens group is configured to have the positive lens and the negative lens aspherically shaped on respective prescribed surfaces to thereby achieve greater angles of view and greater zoom ratios without increasing the number of lenses in the second lens group.

Particularly, the image-facing surface of the negative lens is aspherically shaped, which contributes to greater angles of view, greater zoom ratios and compactness. Specifically, the image-facing surface of the negative lens is aspherically shaped and the radius of curvature at the center and the approximate radius of curvature at the periphery are changed in a large scale, thereby reducing the number of lenses and achieving greater angles of view and greater zoom ratios, which realizes compactness while securing the greater angles of view and greater zoom ratios.

In particular, in the case that the zoom lens provided in the imaging apparatus according to the embodiment of the invention is applied to a collapsible-barrel type imaging apparatus in which a lens barrel is collapsed and expanded, the entire length in the collapsed state can be reduced.

The zoom lens provided in the imaging apparatus according to the embodiment of the invention is configured to satisfy the following Conditional Expressions (1) and (2):

$$0.7 < R2f/R2r < 2.0 \quad (1)$$

$$1.0 < |Sga/Sgs| < 1.5 \quad (2)$$

wherein $R2f$ represents a paraxial radius of curvature of the object-facing surface of the positive lens; $R2r$ represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

A sign of "Sga" and "Sgs" will be "−" (minus sign) when the surface shape of the paraxial radius of curvature is closer to the image side than the aspherical shape, and the sign will be "+" (plus sign) in the converse case.

The Conditional Expressions (1) is an expression defining the ratio between the radius of curvature of the object-facing surface in the positive lens and the radius of curvature of the image-facing surface in the negative lens.

When the lower limit value of the Conditional Expressions (1) is exceeded, the radius of curvature of the object-facing surface of the positive lens becomes too large or the radius of curvature of the image-facing surface of the negative lens becomes too small. When the radius of curvature of the object-facing surface of the positive lens becomes too large, refracting power of the second lens group becomes too small and it becomes difficult to realize compactness of the zoom lens. Conversely, when the radius of curvature of the image-facing surface of the negative lens becomes too small, aberrations are overcorrected and aberration correction as the second lens group becomes difficult as well as the lens becomes highly sensitive to decentering, as a result, manufacture of the lens becomes difficult.

On the other hand, when the upper limit value of the Conditional Expressions (1) is exceeded, the radius of curvature of the object-facing surface of the positive lens becomes too small or the radius of curvature of the image-facing surface of the negative lens becomes too large. When the radius of curvature of the object-facing surface of the positive lens becomes too small, aberrations are overcorrected and aberration correction as the second lens group becomes difficult as well as the lens becomes highly sensitive to decentering, as a result, manufacture of the lens becomes difficult. Conversely, the radius of curvature of the image-facing surface of the negative lens becomes too large, refracting power of the second lens group becomes too small and it becomes difficult to realize compactness of the zoom lens.

Therefore, when the zoom lens provided in the imaging apparatus satisfies Conditional Expression (1), aberrations can be satisfactorily corrected in the second lens group as well as compactness of the zoom lens and manufacturing easiness of respective lenses in the second lens group can be realized.

The Conditional Expressions (2) is an expression defining the aspherical shape formed on the image-facing surface of the negative lens.

When the lower limit value of the Conditional Expressions (2) is exceeded, correction of spherical aberration and coma aberration will be insufficient at an intermediate focal length between the wide angle end and the telephoto end by the aspherical surface formed on the image-facing surface of the negative lens, thus, it is difficult to obtain desired imaging performance.

When the upper limit value of the Conditional Expressions (2) is exceeded, spherical aberration and coma aberration by the aspherical surface formed on the image-facing surface of the negative lens are overcorrected, therefore, the aberration correction as the second lens group will be difficult. Additionally, since the lens becomes highly sensitive to decentering with respect to the object-facing surface of the positive lens, it becomes difficult to manufacture the lens.

Therefore, when the zoom lens provided in the imaging apparatus satisfies Conditional Expression (2), the image-facing surface of the negative lens will be the aspherical surface in which negative refracting power is increased at the periphery, and the negative lens shares the aberration correction with the positive lens, thereby correcting spherical aberration and coma aberration satisfactorily.

In the imaging apparatus according to the embodiment of the invention, it is desirable that image processing of distortion aberration occurring in the zoom lens is performed in the imaging apparatus. The image processing of distortion aberration is performed in the imaging apparatus, thereby making the zoom lens further compact and realizing greater zoom ratios.

FIG. 22 is a block diagram of a digital still camera according to the embodiment of the invention.

An imaging apparatus (digital still camera) 100 includes a camera block 10 having an imaging function, a camera signal processing unit 20 performing signal processing such as analog-to-digital conversion of an image signal obtained as a result of imaging, an image processing unit 30 performing processes of recording and reproducing an image signal, an LCD (liquid crystal display) 40 displaying an image obtained as a result of imaging, a reader/writer 50 reading and writing an image signal in and from a memory card 1000, a CPU (central processing unit) 60 controlling the imaging apparatus as a whole, an input unit 70 including various switches which are operated by a user as occasion demands, and a lens driving control unit 80 for controlling driving of lenses provided in the camera block 10.

The camera block 10 is formed by an optical system including a zoom lens 11 (which includes lenses 1, 2, 3, 4, and 5 according to the embodiment of the invention) and an imaging device 12 such as a CCD (change coupled device) or CMOS (complementary metal oxide semiconductor).

The camera signal processing unit 20 performs various types of signal processing such as conversion of an output signal from the imaging device 12 into a digital signal, noise elimination, corrections for improved image quality, conversion into a luminance signal or a color difference signal.

The image processing unit 30 performs processes of compressing or coding and decompressing or decoding an image signal based on a predetermined image data format and processes for converting data specifications such as resolution.

The LCD 40 has the function of displaying various types of data such as states of operation of a user on the input unit 70 and images obtained as a result of imaging.

The reader/writer 50 writes image data coded by the image processing unit 30 in the memory card 1000 and reads image data recorded in the memory card 1000.

The CPU 60 functions as a control processing unit for controlling respective circuit blocks provided in the imaging apparatus 100, controlling the circuit blocks based on instruction input signals from the input unit 70.

The input unit 70 includes, for example, a shutter release button for operating a shutter and select switches for selecting operation modes, and the unit outputs instruction input signals to the CPU 60 according to operations of the user.

The lens driving control unit 80 controls motors, which are not shown, for driving respective lenses of the zoom lens 11 based on control signals from the CPU 60.

For example, the memory card 1000 is a semiconductor memory which can be inserted and removed in and from a slot connected to the reader/writer 50.

Operations of the imaging apparatus 100 will now be described below.

In an imaging standby state, an image signal obtained by the camera block 10 is output to the LCD 40 through the camera signal processing unit 20 under control exercised by the CPU 60, and the signal is displayed as a camera-through image. When an instruction input signal for zooming is input from the input unit 70, the CPU 60 outputs a control signal to the lens driving control unit 80, and predetermined lenses of the zoom lens 11 are moved under control exercised by the lens driving control unit 80.

When a shutter (not shown) included in the camera block 10 is operated according to an instruction input signal from the input unit 70, the image signal obtained as a result of imaging is output from the camera signal processing unit 20 to the image processing unit 30 to be compressed or coded, and the signal is thus converted into a digital data in a predetermined data format. The converted data is output to the reader/writer 50 and written in the memory card 1000.

For example, when the shutter release button of the input unit 70 is pressed halfway or pressed fully for recording (imaging), the lens driving control unit 80 causes focusing of the zoom lens 11 by moving predetermined lenses thereof based on a control signal from the CPU 60.

When image data recorded in the memory card 1000 is to be reproduced, the predetermined image data is read from the memory card 1000 by the reader/writer 50 according to an operation performed on the input unit 70. The decompressing or decoding process is performed on the data by the image processing unit 30, and a reproduced image signal is thereafter output to the LCD 40 to display the reproduced image.

The above-described embodiment is an example of the use of the imaging apparatus as a digital still camera. The application of the imaging apparatus is not limited to digital still cameras, and the imaging apparatus has a wide range of applications including digital video cameras, cellular phones having a built-in camera, and camera units of digital input/output apparatus such as PDAs (personal digital assistants) having a built-in camera.

All of the shapes and numerical values of the elements shown in the above-described embodiments are merely examples of specific forms for carrying out the invention, and they should not be taken as limitations to the technical scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group having negative refracting power;
   a second lens group having positive refracting power; and
   a third lens group having positive refracting power, disposed in the order from an object side to an image side,
   wherein, during zooming from a wide angle end to a telephoto end, the first lens group is moved and the second lens group is moved together with a stop toward the object such that an air space between the first lens group and the second lens group decreases and such that an air space between the second lens group and the third lens group increases,
   the second lens group includes a positive lens aspherically shaped on at least a side thereof facing the object and having a convex surface facing the object and a negative lens positioned on the image side of the positive lens, aspherically shaped on at least a side thereof facing the image and having a concave surface facing the image, and the zoom lens is configured to satisfy the following Conditional Expressions (1) and (2)

$$0.7 < R2f/R2r < 2.0 \quad (1)$$

$$1.0 < |Sga/Sgs| < 1.5 \quad (2)$$

wherein R2f represents a paraxial radius of curvature of the object-facing surface of the positive lens; R2r represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

2. The zoom lens according to claim 1,
wherein the second lens group includes the positive lens, a positive lens which has a convex surface facing the object and the negative lens, which are disposed in the order from the object side to the image side.

3. The zoom lens according to claim 1, the zoom lens satisfying the following Conditional Expressions (3), (4) and (5)

$$1.5 < |f2/fw| < 2.5 \quad (3)$$

$$2.0 < |f1/fw| < 3.2 \quad (4)$$

$$0.5 < D2/fw < 1.5 \quad (5)$$

wherein f2 represents the focal length of the second lens group; fw represents the focal length of the entire lens system at the state of the wide angle end; f1 represents the focal length of the first lens group; and D2 represents the thickness of the second lens group measured on the optical axis thereof.

4. The zoom lens according to claim 1,
wherein the third lens group is configured by a single lens having a focusing function.

5. The zoom lens according to claim 1, not changing an aperture diameter of the stop during zooming.

6. The zoom lens according to claim 1,
wherein the second lens group includes the positive lens and a cemented lens formed by bonding a positive lens having a convex surface facing the object and the negative lens, which are disposed in the order from the object side to the image side.

7. The zoom lens according to claim 6,
wherein alignment is performed between a positive lens of the second lens group positioned on the object side and a cemented lens of the second lens group.

8. The zoom lens according to claim 1,
wherein the first lens group includes a negative lens aspherically shaped on both sides thereof and having a concave surface facing the image and a positive meniscus lens aspherically shaped on at least a side thereof facing the object and having a convex surface facing the object, which are disposed in the order from the object side to the image side.

9. The zoom lens according to claim 8, the zoom lens satisfying the following Conditional Expressions (6), (7) and (8)

$$n11 > 1.8 \quad (6)$$

$$n12 > 1.9 \quad (7)$$

$$v12 < 25 \quad (8)$$

wherein n11 represents the refractive index of the negative lens in the first lens group measured using a d-ray, n12 represents the refractive index of the positive meniscus lens in the first lens group measured using a d-ray; and v12 represents the Abbe number of the positive meniscus lens in the first lens group.

10. An imaging apparatus comprising:
a zoom lens; and
an imaging device converting an optical image formed by the zoom lens into an electrical signal,
wherein the zoom lens includes a first lens group having negative refracting power, a second lens group having positive refracting power, and a third lens group having positive refracting power, disposed in the order from an object side to an image side,
during zooming from a wide angle end to a telephoto end, the first lens group is moved and the second lens group is moved together with a stop toward the object such that an air space between the first lens group and the second lens group decreases and such that an air space between the second lens group and the third lens group increases, and
the second lens group includes a positive lens aspherically shaped on at least a side thereof facing the object and having a convex surface facing the object and a negative lens positioned on the image side of the positive lens, aspherically shaped on at least a side thereof facing the image and having a concave surface facing the image, and
the imaging apparatus is configured to satisfy the following Conditional Expressions (1) and (2)

$$0.7 < R2f/R2r < 2.0 \quad (1)$$

$$1.0 < |Sga/Sgs| < 1.5 \quad (2)$$

wherein R2f represents a paraxial radius of curvature of the object-facing surface of the positive lens; R2r represents a paraxial radius of curvature of the image-facing surface of the negative lens; Sgs represents the sag of the paraxial radius of curvature of the image-facing surface in the effective aperture of the image-facing surface of the negative lens; and Sga represents the sag of the aspherical shape of the image-facing surface in the effective aperture of the image-facing surface of the negative lens.

* * * * *